US011881210B2

(12) United States Patent
Kenter et al.

(10) Patent No.: US 11,881,210 B2
(45) Date of Patent: Jan. 23, 2024

(54) SPEECH SYNTHESIS PROSODY USING A BERT MODEL

(71) Applicant: Google LLC, Mountain View, CA (US)

(72) Inventors: Tom Marius Kenter, London (GB); Manish Kumar Sharma, London (GB); Robert Andrew James Clark, Hertfordshire (GB); Aliaksei Severyn, Zurich (CH)

(73) Assignee: Google LLC, Mountain View, CA (US)

( * ) Notice: Subject to any disclaimer, the term of this patent is extended or adjusted under 35 U.S.C. 154(b) by 290 days.

(21) Appl. No.: 16/867,427

(22) Filed: May 5, 2020

(65) Prior Publication Data
US 2021/0350795 A1    Nov. 11, 2021

(51) Int. Cl.
*G10L 15/16* (2006.01)
*G06N 3/084* (2023.01)
(Continued)

(52) U.S. Cl.
CPC .............. *G10L 15/16* (2013.01); *G06N 3/084* (2013.01); *G10L 15/02* (2013.01); *G10L 15/063* (2013.01);
(Continued)

(58) Field of Classification Search
CPC ....... G10L 15/16; G10L 15/02; G10L 15/063; G10L 2015/025; G10L 2015/027; G06N 3/084
See application file for complete search history.

(56) References Cited

U.S. PATENT DOCUMENTS

2019/0348020 A1*  11/2019  Clark ..................... G06N 3/084
2021/0133581 A1*  5/2021  Podgorny ............... G06F 40/35
(Continued)

FOREIGN PATENT DOCUMENTS

CN         110543242 A     12/2019

OTHER PUBLICATIONS

Kondratyuk et al., "75 Languages, 1 Model: Parsing Universal Dependencies Universally" arXiv preprint arXiv:1904.02099 (2019). (Year: 2019).*

(Continued)

*Primary Examiner* — Huyen X Vo
*Assistant Examiner* — Edward Tracy, Jr.
(74) *Attorney, Agent, or Firm* — Honigman LLP; Brett A. Krueger; Grant Griffith

(57) ABSTRACT

A method for generating a prosodic representation includes receiving a text utterance having one or more words. Each word has at least one syllable having at least one phoneme. The method also includes generating, using a Bidirectional Encoder Representations from Transformers (BERT) model, a sequence of wordpiece embeddings and selecting an utterance embedding for the text utterance, the utterance embedding representing an intended prosody. Each wordpiece embedding is associated with one of the one or more words of the text utterance. For each syllable, using the selected utterance embedding and a prosody model that incorporates the BERT model, the method also includes generating a corresponding prosodic syllable embedding for the syllable based on the wordpiece embedding associated with the word that includes the syllable and predicting a duration of the syllable by encoding linguistic features of each phoneme of the syllable with the corresponding prosodic syllable embedding for the syllable.

24 Claims, 8 Drawing Sheets

(51) Int. Cl.
*G10L 15/02* (2006.01)
*G10L 15/06* (2013.01)

(52) U.S. Cl.
CPC .. *G10L 2015/025* (2013.01); *G10L 2015/027* (2013.01)

(56) References Cited

U.S. PATENT DOCUMENTS

2021/0286947 A1* 9/2021 Pajak ................. G06N 3/08
2021/0312905 A1* 10/2021 Zhao ................. G06N 3/0445
2021/0312906 A1* 10/2021 Kuo ................. G06N 3/0454

OTHER PUBLICATIONS

Kitaev et al., "Multilingual constituency parsing with self-attention and pretraining." arXiv preprint arXiv:1812.11760 (2018). (Year: 2018).*

Probing the phonetic and phonological knowledge of tones in Mandarin TTS models, Jian Zhu, Dec. 23, 2019.

International Search Report, Application No. PCT/US2021/029505, dated Jul. 27, 2021, 17 pages.

Kenter et al., "Improving the Prosody of RNN-Based English Text-To-Speech Synthesis by Incorporating a BERT Model,", Interspeech 2020, Oct. 25, 2020, 5 pages.

Hayashi et al., "Pre-Trained Text Embeddings for Enhanced Text-to-Speech Synthesis," Interspeech 2019, Jan. 2, 2019, 5 pages.

Xiao et al., "Improving Prosody with Linguistic and Bert Derived Featrues in Multi-Speaker Based Mandarin Chinese Neural TTS," May 4, 2020, 5 pages.

* cited by examiner

SPEECH SYNTHESIS PROSODY USING A BERT MODEL

TECHNICAL FIELD

This disclosure relates to speech synthesis prosody using a Bidirectional Encoder Representations from Transformers (BERT) model.

BACKGROUND

Speech synthesis systems use text-to-speech (TTS) models to generate speech from textual input. The generated/synthesized speech should accurately convey the message (intelligibility) while sounding like human speech (naturalness) with an intended prosody (expressiveness). While traditional concatenative and parametric synthesis models are capable of providing intelligible speech and recent advances in neural modeling of speech have significantly improved the naturalness of synthesized speech, most existing TTS models are ineffective at modeling prosody, thereby causing synthesized speech used by important applications to lack expressiveness. For instance, it is desirable for applications such as conversational assistants and long-form readers to produce realistic speech by imputing prosody features not conveyed in textual input, such as intonation, stress, and rhythm and style. For example, a simple statement can be spoken in many different ways depending on whether the statement is a question, an answer to a question, there is uncertainty in the statement, or to convey any other meaning about the environment or context which is unspecified by the input text.

Bidirectional Encoder Representations from Transformers (BERT) models provide representations proven to embody syntactic information in a more robust way than traditional parsing and tagging techniques. Moreover, BERT models are capable of providing useful cues beyond syntax, such as word semantics and world knowledge in the text-only domain.

SUMMARY

One aspect of the disclosure provides a method for predicting a prosodic representation of a text utterance. The method includes receiving, at data processing hardware, a text utterance having one or more words, each word having at least one syllable, each syllable having at least one phoneme; generating, by the data processing hardware, using a Bidirectional Encoder Representations from Transformers (BERT) model, a sequence of wordpiece embeddings, each wordpiece embedding associated with one of the one or more words of the text utterance, and selecting, by the data processing hardware, an utterance embedding for the text utterance, the utterance embedding representing an intended prosody. For each syllable, using the selected utterance embedding and a prosody model that incorporates the BERT model, the method also includes generating, by the data processing hardware, a corresponding prosodic syllable embedding for the syllable based on the wordpiece embedding associated with the word that includes the syllable; and predicting, by the data processing hardware, a duration of the syllable by encoding linguistic features of each phoneme of the syllable with the corresponding prosodic syllable embedding for the syllable. The method also includes generating, by the data processing hardware, using the prosody model, a prosodic representation for the text utterance based on the predicted durations of the syllables.

Implementations of the disclosure may include one or more of the following optional features. In some implementations, the method also includes, for each syllable, using the selected utterance embedding and the prosody model: predicting, by the data processing hardware, a pitch contour of the syllable based on the predicted duration for the syllable; and generating, by the data processing hardware, a plurality of fixed-length predicted pitch frames based on the predicted duration for the syllable. Each fixed-length predicted pitch frame represents part of the predicted pitch contour of the syllable. In these implementations, generating the prosodic representation for the utterance is based on the plurality of fixed-length predicted pitch frames generated for each syllable.

In additional implementations, the method also includes, for each syllable, using the selected utterance embedding and the prosody model: predicting, by the data processing hardware, an energy contour of each phoneme in the syllable based on a predicted duration for the phoneme, and for each phoneme associated with the syllable, generating, by the data processing hardware, a plurality of fixed-length predicted energy frames based on the predicted duration for the corresponding phoneme. Each fixed-length energy frame represents the predicted energy contour of the corresponding phoneme. In these implementations, generating the prosodic representation for the utterance is further based on the plurality of fixed-length predicted energy frames generated for each phoneme associated with each syllable.

In some examples, a hierarchical linguistic structure represents the text utterance, the hierarchical linguistic structure includes: a first level including each syllable of the text utterance; a second level including each phoneme of the text utterance; a third level including each fixed-length predicted pitch frame for each syllable of the text utterance; and a fourth level parallel to the third level and including each fixed-length predicted energy frame for each phoneme of the text utterance. The lengths of the fixed-length predicted energy frames and the fixed-length predicted pitch frames may be the same. A total number of fixed-length predicted energy frames generated for each phoneme of the received text utterance may equal to a total number of the fixed-length predicted pitch frames generated for each syllable of the received text utterance.

The first level of the hierarchical linguistic structure may include a long short-term memory (LSTM) processing cell representing each syllable of the text utterance; the second level of the hierarchical linguistic structure may include a LSTM processing cell representing each phoneme of the text utterance, the LSTM processing cells of the second level clocking relative to and faster than the LSTM processing cells of the first level; the third level of the hierarchical linguistic structure may include a LSTM processing cell representing each fixed-length predicted pitch frame, the LSTM processing cells of the third level clocking relative to and faster than the LSTM processing cells of the second level, and the fourth level of the hierarchical linguistic structure may include a LSTM processing cell representing each fixed-length predicted energy frame, the LSTM processing cells of the fourth level clocking at the same speed as the LSTM processing cells of the third level and clocking relative to and faster than the LSTM processing cells of the second level.

In some implementations, the method also includes obtaining the BERT model, receiving training data including a plurality of reference audio signals and corresponding transcripts, and training, using a deep neural network that incorporates the BERT model, the prosody model by encoding each reference audio signal into a corresponding fixed-length utterance embedding representing a corresponding prosody of the reference audio signal. Here, the BERT model is trained on a text-only language modeling task, each reference audio signal includes a spoken utterance of human speech and has the corresponding prosody, and each transcript includes a textual representation of the corresponding reference audio signal.

In these implementations, encoding each reference audio signal into a corresponding fixed-length utterance embedding includes: generating, using the BERT model, a sequence of wordpiece embeddings from the transcript of the corresponding reference audio signal, sampling, from the corresponding reference audio signal, a sequence of fixed-length reference frames providing a duration, pitch contour, and/or energy contour that represents the corresponding prosody of the reference audio signal; and for each syllable in the reference audio signal: encoding phone-level linguistic features associated with each phoneme in the syllable into a phone feature-based syllable embedding; encoding the fixed-length reference frames associated with the syllable into a frame-based syllable embedding, the frame-based syllable embedding indicative of a duration, pitch, and/or energy associated with the corresponding syllable; and encoding, into a corresponding prosodic syllable embedding for the syllable, the phoneme feature-based and frame-based syllable embeddings with syllable-level linguistic features associated with the syllable, sentence-level linguistic features associated with the reference audio signal, and a wordpiece embedding from the sequence of wordpiece embeddings generated by the BERT model that is associated with a word that includes the corresponding syllable.

Additionally, training the prosody model may further include, for each reference audio signal; sampling, from the corresponding reference audio signal, a sequence of fixed-length reference frames providing a duration, pitch contour, and/or energy contour that represents the corresponding prosody of the reference audio signal; decoding, using the transcript of the corresponding reference audio signal, the corresponding fixed-length utterance embedding into a sequence of fixed-length predicted frames representing a prosodic representation of the transcript, generating gradients/losses between the sequence of fixed-length predicted frames and the sequence of fixed-length reference frames sampled; and back-propagating the gradients/losses through the prosody model. The back-propagating of the gradients/losses through the prosody model may include fine-tuning the pre-trained BERT model by updating parameters of the pre-trained BERT model based on the gradients/losses back-propagating through the prosody model. The utterance embedding may include a fixed-length numerical vector.

Another aspect of the disclosure provides a system for predicting a prosodic representation of a text utterance. The system includes data processing hardware and memory hardware in communication with the data processing hardware. The memory hardware stores instructions that when executed on the data processing hardware cause the data processing hardware to perform operations. The operations include receiving a text utterance having at least one word, and selecting an utterance embedding for the text utterance. Each word in the text utterance has at least one syllable and each syllable has at least one phoneme. The utterance embedding represents an intended prosody. The operations also include generating, using a Bidirectional Encoder Representations from Transformers (BERT) model, a sequence of wordpiece embeddings, each wordpiece embedding associated with one of the one or more words of the text utterance. For each syllable, using the selected utterance embedding and a prosody model that incorporates the BERT model, the operations also include generating a corresponding prosodic syllable embedding for the syllable based on the wordpiece embedding associated with the word that includes the syllable and predicting a duration of the syllable by encoding linguistic features of each phoneme of the syllable with the corresponding prosodic syllable embedding for the syllable. The operations also include generating, using the prosody model, a prosodic representation for the text utterance based on the predicted durations of the syllables.

This aspect may include one or more of the following optional features. In some implementations, the operations also include, for each syllable, using the selected utterance embedding and the prosody model: predicting a pitch contour of the syllable based on the predicted duration for the syllable and generating a plurality of fixed-length predicted pitch frames based on the predicted duration for the syllable. Each fixed-length predicted pitch frame represents part of the predicted pitch contour of the syllable. In these implementations, generating the prosodic representation for the utterance is based on the plurality of fixed-length predicted pitch frames generated for each syllable.

In additional implementations, the operations also include, for each syllable, using the selected utterance embedding and the prosody model: predicting an energy contour of each phoneme in the syllable based on a predicted duration for the phoneme, and for each phoneme associated with the syllable, generating a plurality of fixed-length predicted energy frames based on the predicted duration for the corresponding phoneme. Each fixed-length energy frame represents the predicted energy contour of the corresponding phoneme. In these implementations, generating the prosodic representation for the utterance is further based on the plurality of fixed-length predicted energy frames generated for each phoneme associated with each syllable.

In some examples, a hierarchical linguistic structure represents the text utterance, the hierarchical linguistic structure includes: a first level including each syllable of the text utterance; a second level including each phoneme of the text utterance; a third level including each fixed-length predicted pitch frame for each syllable of the text utterance; and a fourth level parallel to the third level and including each fixed-length predicted energy frame for each phoneme of the text utterance. The lengths of the fixed-length predicted energy frames and the fixed-length predicted pitch frames may be the same. A total number of fixed-length predicted energy frames generated for each phoneme of the received text utterance may equal to a total number of the fixed-length predicted pitch frames generated for each syllable of the received text utterance.

The first level of the hierarchical linguistic structure may include a long short-term memory (LSTM) processing cell representing each syllable of the text utterance; the second level of the hierarchical linguistic structure may include a LSTM processing cell representing each phoneme of the text utterance, the LSTM processing cells of the second level clocking relative to and faster than the LSTM processing cells of the first level; the third level of the hierarchical linguistic structure may include a LSTM processing cell representing each fixed-length predicted pitch frame, the LSTM processing cells of the third level clocking relative to and faster than the LSTM processing cells of the second level; and the fourth level of the hierarchical linguistic structure may include a LSTM processing cell representing each fixed-length predicted energy frame, the LSTM processing cells of the fourth level clocking at the same speed as the LSTM processing cells of the third level and clocking relative to and faster than the LSTM processing cells of the second level.

In some implementations, the operations also include obtaining the BERT model, receiving training data including a plurality of reference audio signals and corresponding transcripts, and training, using a deep neural network that incorporates the BERT model, the prosody model by encoding each reference audio signal into a corresponding fixed-length utterance embedding representing a corresponding prosody of the reference audio signal. Here, the BERT model is trained on a text-only language modeling task, each reference audio signal includes a spoken utterance of human speech and has the corresponding prosody, and each transcript includes a textual representation of the corresponding reference audio signal.

In these implementations, encoding each reference audio signal into a corresponding fixed-length utterance embedding includes: generating, using the BERT model, a sequence of wordpiece embeddings from the transcript of the corresponding reference audio signal, sampling, from the corresponding reference audio signal, a sequence of fixed-length reference frames providing a duration, pitch contour, and/or energy contour that represents the corresponding prosody of the reference audio signal; and for each syllable in the reference audio signal: encoding phone-level linguistic features associated with each phoneme in the syllable into a phone feature-based syllable embedding; encoding the fixed-length reference frames associated with the syllable into a frame-based syllable embedding, the frame-based syllable embedding indicative of a duration, pitch, and/or energy associated with the corresponding syllable; and encoding, into a corresponding prosodic syllable embedding for the syllable, the phoneme feature-based and frame-based syllable embeddings with syllable-level linguistic features associated with the syllable, sentence-level linguistic features associated with the reference audio signal, and a wordpiece embedding from the sequence of wordpiece embeddings generated by the BERT model that is associated with a word that includes the corresponding syllable.

Additionally, training the prosody model may further include, for each reference audio signal: sampling, from the corresponding reference audio signal, a sequence of fixed-length reference frames providing a duration, pitch contour, and/or energy contour that represents the corresponding prosody of the reference audio signal; decoding, using the transcript of the corresponding reference audio signal, the corresponding fixed-length utterance embedding into a sequence of fixed-length predicted frames representing a prosodic representation of the transcript; generating gradients/losses between the sequence of fixed-length predicted frames and the sequence of fixed-length reference frames sampled; and back-propagating the gradients/losses through the prosody model. The back-propagating of the gradients/losses through the prosody model may include fine-tuning the pre-trained BERT model by updating parameters of the pre-trained BERT model based on the gradients/losses back-propagating through the prosody model. The utterance embedding may include a fixed-length numerical vector.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
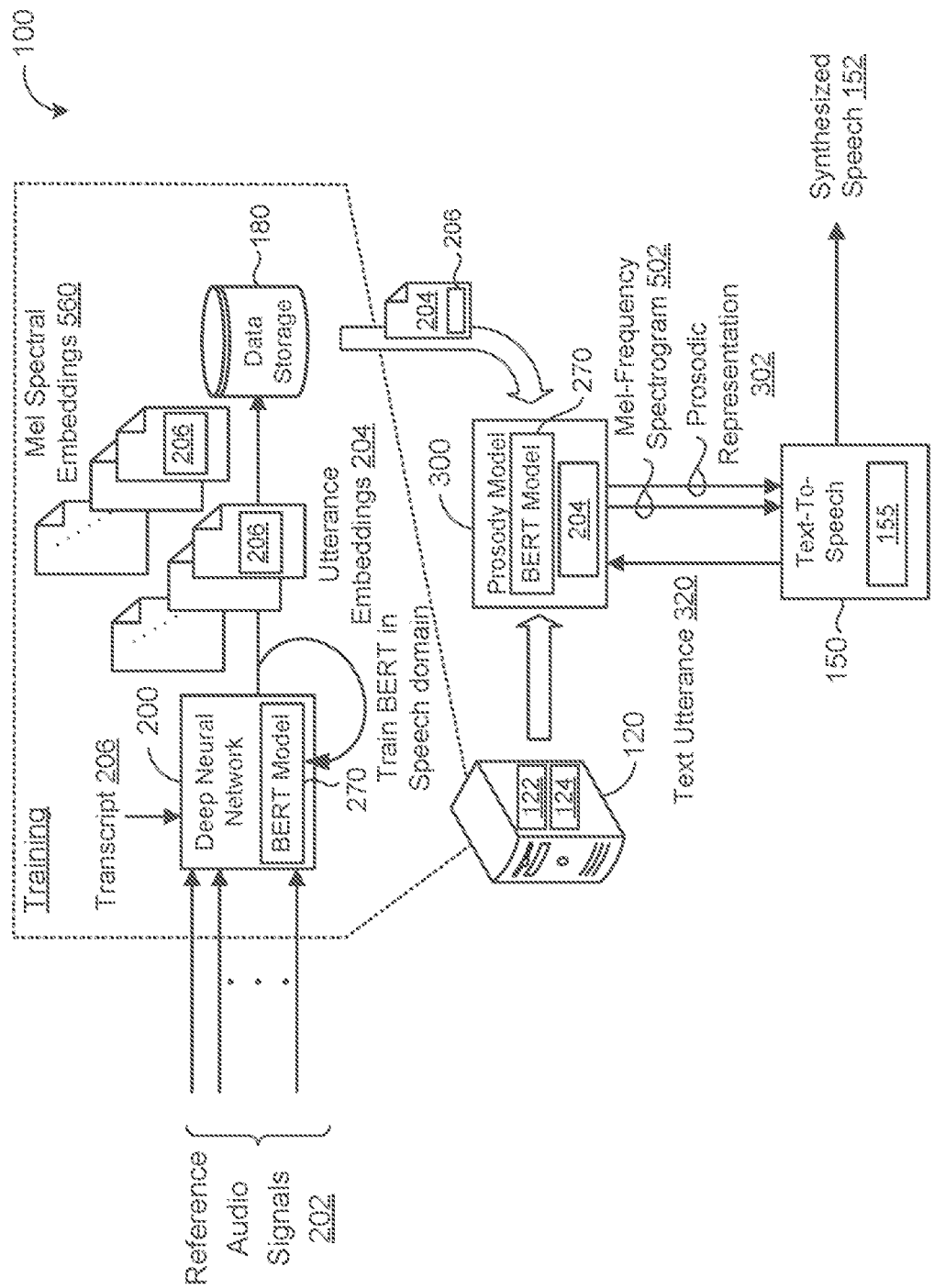
FIG. 1 is a schematic view of an example system for training a deep neural network that incorporates a Bidirectional Encoder Representations from Transformers (BERT) model to provide a controllable prosody model for use in predicting a prosodic representation for a text utterance.

Text-to-speech (TTS) models, often used by speech synthesis systems, are generally only given text inputs without any reference acoustic representation at runtime, and must impute many linguistic factors that are not provided by the text inputs in order to produce realistically sounding synthesized speech. A subset of these linguistic factors are collectively referred to as prosody and may include intonation (pitch variation), stress (stressed syllables vs. non-stressed syllables), duration of sounds, loudness, tone, rhythm, and style of the speech. Prosody may indicate the emotional state of the speech, the form of the speech (e.g., statement, question, command, etc.), the presence of irony or sarcasm of the speech, uncertainty in the knowledge of the speech, or other linguistic elements incapable of being encoded by grammar or vocabulary choice of the input text. Accordingly, a given text input that is associated with a high degree of prosodic variation can produce synthesized speech with local changes in pitch and speaking duration to convey different semantic meanings, and also with global changes in the overall pitch trajectory to convey different moods and emotions.

Neural network models provide potential for robustly synthesizing speech by predicting linguistic factors corresponding to prosody that are not provided by text inputs. As a result, a number of applications, such as audiobook narration, news readers, voice design software, and conversational assistants can produce realistically sounding synthesized speech that is not monotonous-sounding. Conventionally, input text is usually enriched with syntax information obtained from taggers and parsers, and as such, no information about semantics or world knowledge is available to the TTS models because this type of information cannot be inferred from text alone. Furthermore, when the input text is enriched by syntax information, errors made by the algorithms providing this information can propagate through the neural network, often times degrading synthesis instead of improving synthesis.

Implementations herein are directed toward a neural network prosody model that incorporates a Bidirectional Encoder Representations from Transformers (BERT) model into a variational autoencoder (VAE) having an encoder portion and an a decoder portion. The encoder portion is configured to encode a reference audio signal corresponding to a spoken utterance into an utterance embedding that represents the prosody of the spoken utterance, while the decoder portion is configured to decode the utterance embedding to predict prosodic features, such as durations of phonemes and pitch and energy contours for each syllable. In some examples, the VAE is configured to decode an utterance embedding to predict mel-spectral spectrograms in addition to or in lieu of the prosodic features.

The BERT model may be pre-trained on text initially, and then parameters of the BERT model may be fine-tuned on a speech synthesis task, i.e., based on the predicted prosodic features output by the model. As opposed to conventional tagging and parsing techniques that extract error-prone syntactic information from input text, without the ability to convey any sematic information or world knowledge, the BERT model is able to provide useful cues related to word semantics and world knowledge, while also embodying the syntactic information in a more robust way that the conventional tagging and parsing techniques. As will become apparent, implementations herein use output representations (e.g., wordpiece embeddings) from the BERT model that implicitly capture a linguistic structure of the input text to replace features reserved for encoding the syntactic information explicitly.

Pre-training the BERT model on a language modeling task permits semantic information to be incorporated into the neural network prosody model, thereby enabling the prosody model to correctly pronounce longer noun compounds that are typically difficult for standard parsing techniques to resolve. For instance, knowledge that the noun compound 'diet cat food" should be interpreted as '(diet (cat food))' rather than '((diet cat) food)' can be incorporated into the pre-trained BERT model. The BERT model provides additional advantages for linguistically challenging text sentences, such as those that are long and/or difficult to parse, because BERT representations are not subject to parsing information errors that explicit features are prone to embody.

The encoder portion of the VAE may train utterance embeddings representing prosody by encoding numerous reference audio signals conditioned on prosodic features, linguistic features, and BERT wordpiece (WP) embeddings representing the utterances. The prosodic features represent acoustic information about the reference audio signals in terms of pitch (F0), phoneme duration, and energy (C0) For instance, the prosodic features may include phoneme durations and fixed-length frames of pitch and energy sampled from the reference audio signal. The linguistic features may include, without limitation: phoneme-level linguistic features, containing information about the position of a phoneme in a syllable, the phoneme identity, and a number of phonemes in a syllable; syllable-level linguistic features, containing information such as whether a syllable is stressed or un-stressed; and sentence-level linguistic features containing information about a speaker, a gender of the speaker, and/or whether the utterance is a question or phrase. The BERT WP embeddings are configured to replace word-level linguistic features that would otherwise encode syntactic information about each word explicitly. As aforementioned, parsing and tagging techniques extract the syntactic information from the text directly, and may be prone to errors, such that the word-level linguistic features encoding this syntactic information may be inaccurate. The word-level linguistic features typically convey the following types of syntactic information for each word: a part-of-speech (POS) tag (e.g., noun/adjective/verb), a dependency parse tree, phrase level features (indicating if a phrase is part of a question or statement, and preceding or subsequent punctuation marks). The WP embeddings produced by the BERT model may convey this syntactic information implicitly and in a more robust way than then the parsers and taggers, while additionally providing word semantics and world knowledge that parsing techniques cannot obtain from text alone. Accordingly, the encoder portion conditions each word at the word-level on WP embeddings produced by the BERT model in lieu of word-level linguistic features explicitly encoding syntactic information extracted from text via parsing and tagging.

Each utterance embedding encoded by the encoder portion is represented by a fixed-length numerical vector. In some implementations, the fixed-length numerical vector includes a value equal to 256. However, other implementations may use fixed-length numerical vectors having values greater than or less than 256 The decoder portion may decode a fixed-length utterance embedding into a sequence of phoneme durations via a first decoder and into a sequence of fixed-length frames (e.g., five millisecond) of pitch and energy using the phoneme durations. The sequence of phoneme durations and fixed-length frames of pitch and energy correspond to prosodic features predicted by the decoder portion. During training, the prosodic features of phoneme durations and fixed-length frames of pitch and energy predicted by the decoder portion closely match the prosodic features of phoneme durations and fixed-length frames of pitch and energy sampled from the reference audio signal associated with the fixed-length utterance embedding.

The VAE of the present disclosure includes a Clockwork Hierarchal Variational Autoencoder (CHiVE) that incorporates hierarchical stacked layers of long-short term-memory (LSTM) cells, with each layer of LSTM cells incorporating structure of the utterance such that one layer represents phonemes, a next layer represents syllables, and another layer represents words. Moreover, the hierarchy of stacked layers of LSTM cells are variably clocked to a length of hierarchical input data. For instance, if the input data contains a word of three syllables followed by a word of four syllables, then the syllable layer of the CHiVE would clock three times relative to a single clock of the word layer for the first input word, and then the syllable layer would clock four more times relative to a subsequent single clock of the word layer for the second word. Thus, rather than using frame-based techniques where memory associated with given LSTM cell is only effective for about a half second (i.e., 100 times steps with a five (5) millisecond frame rate), and thus, only providing the LSTM cell memory for two or three syllables of speech, the phoneme, word, and syllable layers of the CHiVE clock with phonemes, words, and syllables, respectively, giving the LSTM cells of the stacked layers memory over the last 100 words, syllables, or phonemes. For each syllable in the utterance, the CHIVE encodes the prosodic features (e.g., pitch (F0), phoneme duration, and energy (C0)), the phone-level linguistic features, the syllable-level linguistic features, the WP embeddings produced by the BERT model, and sentence-level linguistic features.

During inference, the CHiVE is configured to receive a text utterance and select an utterance embedding for the text utterance. The received text utterance has at least one word, each word has at least one syllable, and each syllable has at least one phoneme. Since the text utterance is missing context, semantic information, and pragmatic information to guide the appropriate prosody for producing synthesized speech from the utterance, the CHiVE uses that selected utterance embedding as the latent variable to represent an intended prosody. The CHiVE further incorporates the BERT model to produce a sequence of WP embeddings for the text utterance to convey syntactic information, as well as word semantics and world knowledge, to the CHiVE. Thereafter, the CHiVE concatenates the selected utterance embedding with sentence-level and syllable-level linguistic features obtained from the text utterance and the WP embeddings produced by the BERT model to predict a duration of each syllable and predict a pitch of each syllable based on the predicted duration for the syllable. Lastly, the CHiVE is configured to generate a plurality of fixed-length pitch frames based on the predicted duration for each syllable such that each fixed-length pitch frame represents the predicted pitch of the syllable. The CHiVE may similarly predict energy (e.g., loudness) of each syllable based on the predicted duration for the syllable and generate a plurality of fixed-length energy frames each representing the predicted energy of the syllable. The fixed-length pitch and/or energy frames may be provided to a unit-selection model or wavenet model of a ITS system to produce the synthesized speech with the intended prosody provided by the input fixed-length utterance embedding.

FIG. 1 shows an example system 100 for training a deep neural network 200 to provide a controllable prosody model 300, and for predicting a prosodic representation 302 for a text utterance 320 using the prosody model 300. The system 100 includes a computing system 120 having data processing hardware 122 and memory hardware 124 in communication with the data processing hardware 122 and storing instructions that cause the data processing hardware 122 to perform operations. In some implementations, the computing system 120 (e.g., the data processing hardware 122) provides a prosody model 300 based on a trained deep neural network 200 to a text-to-speech (TTS) system 150 for controlling prosody of synthesized speech 152 from an input text utterance 320. Since the input text utterance 320 has no way of conveying context, semantics, and pragmatics to guide the appropriate prosody of the synthesized speech 152, the prosody model 300 may predict a prosodic representation 322 for the input text utterance 320 by conditioning the model 300 on linguistic features extracted from the text utterance 320 and wordpiece (WP) embeddings 242 (FIG. 2A) produced by a Bidirectional Encoder Representations from Transformers (BERT) model 270, and using a fixed-length utterance embedding 204 as a latent variable representing an intended prosody for the text utterance 320. In some examples, the computing system 120 implements the TTS system 150. In other examples, the computing system 120 and the TTS system 150 are distinct and physically separate from one another. The computing system may include a distributed system (e.g., cloud computing environment). The TTS system 150 may include a vocoder 155.

In some implementations, the deep neural network 200 is trained on a large set of reference audio signals 202. Each reference audio signal 202 may include a spoken utterance of human speech recorded by a microphone and having a prosodic representation. During training, the deep neural network 200 may receive multiple reference audio signals 202 for a same spoken utterance, but with varying prosodies (i.e., the same utterance can be spoken in multiple different ways). Here, the reference audio signals 202 are of variable-length such that the duration of the spoken utterances varies even though the content is the same. The deep neural network 200 is configured to encode/compress the prosodic representation associated with each reference audio signal 202 into a corresponding fixed-length utterance embedding 204. The deep neural network 200 may store each fixed-length utterance embedding 204 in an utterance embedding storage 180 (e.g., on the memory hardware 124 of the computing system 120) along with a corresponding transcript 206 of the reference audio signal 222 associated the utterance embedding 260.

In the example shown, the deep neural network 200 incorporates the BERT model 270 to produce the WP embeddings 242 from the transcripts 206. The BERT model 270 may be pre-trained on text-only, e.g., during a language modeling task, to produce WP embeddings that embody syntactic information (e.g., linguistic structure) of the transcripts 206 implicitly, while also providing useful cues beyond syntax, such as word semantics and world knowledge that may help the network 200 learn correct pronunciation of longer noun compounds. The deep neural network 200 may be further trained by back-propagating the fixed-length utterance embeddings 204 conditioned upon the WP embeddings 242 and the linguistic features extracted from the transcripts 206 to generate/predict prosodic features of fixed-length frames of pitch, energy, and duration of each phoneme. In some implementations, the BERT model 270, which was initially pre-trained on text only, is further trained (e.g., fine-tuned) in unison with the deep neural network via the back-propagation based on losses between reference prosodic features and the predicted prosodic features of fixed-length frames of pitch, energy, and duration of each phoneme. The text used to pre-train the BERT model 270 generally has no association with the transcripts 206. Thus, the BERT model 270 may be optimized for speech synthesis tasks by fine-tuning parameters of the BERT model on outputs in the speech-domain. Notably, as the BERT model 270 executes as part of the full autoencoder prosody model 300, gradients flow all the way through the Bert model 270, up until, but not including, the WP embedding lookup table (e.g., WP embedding layer).

To handle arbitrarily long sequences of wordpiece units 272 (FIG. 2A) obtained from input text 206, 320, the BERT model 270 may be augmented by splitting the sequences of wordpiece units ($wp_1, wp_2, \ldots, wp_n$) 272 into windows of size m, if n>m, and presenting these windows to the model 300 as a mini-batch. Here, the windows may overlap by stride size s, which may be set to be half of the input size (m−2)/2. In some examples, each window $w_i$, for i∈{0, 1, . . . , (⌈n/s−2⌉} is expressed as follows.

$$w_i=\{\text{START},p_{i\cdot s+1},p_{i\cdot s+2},\ldots,p_{i\cdot s+m},\text{END}\}, \quad (1)$$

where $p_i$ is the wordpiece at position i, and START and END are start and end tokens, respectively. The START token of the first window is a standard [CLS] token, and a [CONT] is used for any subsequent window. The END token of the last window is the stand end-of-sequence token [SEP] (which can occur earlier in the window, in which case padding follows to fill up to size m), and a [BREAK] token for any window preceding the last window. To combine the ⌈n/s⌉−2 overlapping windows of length in to a sequence of length n again, the wordpiece embeddings indexed [s/2] 1 up to [s/2]−1 may be concatenated from every window, except for the first window, which starts from index 0, and the last window, which ends at an index of the [SEP] token. In some examples, the model 300 includes an input size of m=512, i.e., the model reads 512 WP embeddings 272 at a time.

During inference, the computing system 120 may use the prosody model 300 to predict a prosodic representation 322 for a text utterance 320. The prosodic representation 322 may correspond to predicted prosodic features of pitch, energy, and duration of each phoneme. The prosody model 300 may select an utterance embedding 204 for the text utterance 320. The utterance embedding 206 represents an intended prosody of the text utterance 320. Described in greater detail below with reference to FIGS. 2A-2B and 3A-3B, the prosody model 300 may predict the prosodic representation 322 for the text utterance 320 using the selected utterance embedding 204. The prosodic representation 322 may include prosodic features of predicted pitch, predicted timing, and predicted loudness (e.g., energy) for the text utterance 320. In the example shown, the TTS system 150 uses the prosodic representation 322 to produce synthesized speech 152 from the text utterance 320 and having the intended prosody.

Figure 2A:
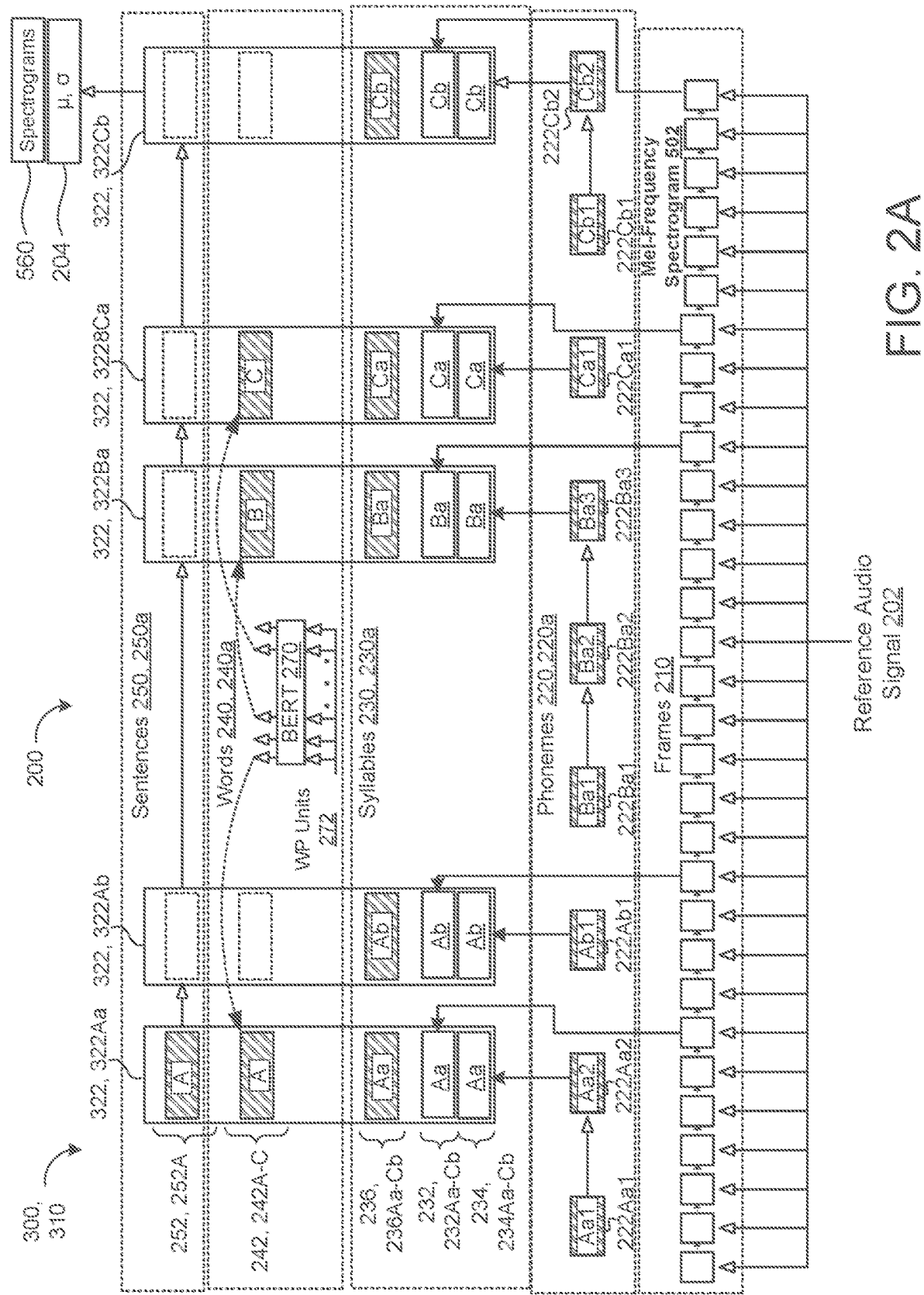
FIG. 2A is a schematic view of a hierarchical linguistic structure incorporating a BERT model for encoding prosody of a reference audio signal into a fixed-length utterance embedding.

FIGS. 2A and 23 show a hierarchical linguistic structure (e.g., deep neural network of FIG. 1) 200 for a clockwork hierarchal variational autoencoder (CHiVE) 300 ('autoencoder 300') that provides a controllable model of prosody. The controllable model of prosody may jointly predict, for each syllable of given input text, a duration of the syllable and pitch (F0) and energy (C0) contours for the syllable without relying on any unique mappings from the given input text or other linguistic specification to produce synthesized speech 152 having an intended/selected prosody. The autoencoder 300 includes an encoder portion 310 (FIG. 2A) that encodes a plurality of fixed-length reference frames 210 sampled from a reference audio signal 202 into a fixed-length utterance embedding 204, and a decoder portion 330 (FIG. 2B) that learns how to decode the fixed-length utterance embedding 204. The decoder portion 330 may decode the fixed-length utterance embedding 204 into a plurality of fixed-length predicted frames 280 (e.g., to predict pitch (F0), energy (C0), or spectral characteristics (M0) for the utterance embedding 204). As will become apparent, the autoencoder 300 is trained so that the number of predicted frames 280 output from the decoder portion 330 is equal to the number of reference frames 210 input to the encoder portion 310. Moreover, the autoencoder 300 is trained so that data associated with the reference and predicted frames 210, 280 substantially match one another.

Referring to FIG. 2A, the encoder portion 302 receives the sequence of fixed-length reference frames 210 from the input reference audio signal 202. The input reference audio signal 202 may include a spoken utterance of human speech recorded by a microphone that includes a target prosody. The encoder portion 310 may receive multiple reference audio signals 202 for a same spoken utterance, but with varying prosodies (i.e., the same utterance can be spoken in multiple different ways). For example, the same spoken utterance may vary in prosody when the spoken reference is an answer to a question compared to when the spoken utterance is a question. The reference frames 210 may each include a duration of 5 milliseconds (ns) and represent one of a contour of pitch (F0) or a contour of energy (C0) for the reference audio signal 202. In parallel, the encoder portion 310 may also receive a second sequence of reference frames 210 each including a duration of 5 ms and representing the other one of the contour of pitch (F0) or the contour of energy (C0) for the reference audio signal 202. Accordingly, the sequence reference frames 210 sampled from the reference audio signal 202 provide a duration, pitch contour, and/or energy contour to represent prosody for the reference audio signal 202. The length or duration of the reference audio signal 202 correlates to a sum of the total number of reference frames 210.

The encoder portion 310 includes hierarchical levels of reference frames 210, phonemes 220, 220a, syllables 230, 230a, words 240, 240a, and sentences 250, 250a for the reference audio signal 202 that clock relative to one another. For instance, the level associated with the sequence of reference frames 210 clocks faster than the next level associated with the sequence of phonemes 220. Similarly, the level associated with the sequence of syllables 230 clocks slower than the level associated with the sequence of phonemes 330 and faster than the level associated with the sequence of words 240. Accordingly, the slower clocking layers receive, as input, an output from faster clocking layers so that the output after the final clock (i.e., state) of a faster layer is taken as the input to the corresponding slower layer to essentially provide a sequence-to-sequence encoder. In the examples shown, the hierarchical levels include Long Short-Term Memory (LSTM) levels.

In the example shown, the reference audio signal 202 includes one sentence 240, 240A with three words 240, 240A-C. The first word 240, 240A includes two syllables 230, 230Aa-Ab. The second word 240, 240B includes one syllable 230, 230Ba. The third word 240, 240a includes two syllables 230, 230Ca-Cb. The first syllable 230, 230Aa of the first word 240, 240A includes two phonemes 220, 220Aa1-Aa2. The second syllable 230, 230Ab of the first word 240, 240A includes one phoneme 220, 220Ab1. The first syllable 230, 230Ba of the second word 240, 240B includes three phonemes 220, 220Ba1-Ba3. The first syllable 230, 230Ca of the third word 240, 240C includes one phoneme 220, 220Ca1. The second syllable 230, 230Cb of the third word 240, 240C includes two phonemes 220, 220Cb1-Cb2.

In some implementations, the encoder portion 310 first encodes the sequence of reference frames 210 into frame-based syllable embeddings 232, 232Aa-Cb. Each frame-based syllable embedding 232 may indicate reference prosodic features represented as a numerical vector indicative of a duration, pitch (F0), and/or energy (C0) associated with the corresponding syllable 230. In some implementations, the reference frames 210 define a sequence of phonemes 220Aa1-220Cb2. Here, instead of encoding a subset of reference frames 210 into one or more phonemes 220, the encoder portion 310 instead accounts for the phonemes 220 by encoding phone level linguistic features 222, 222Aa1-Cb2 into phone feature-based syllable embeddings 234, 234Aa-Cb. Each phoneme-level linguistic feature 222 may indicate a position of the phoneme, while each phoneme feature-based syllable embedding 234 include a vector indicating the position of each phoneme within the corresponding syllable 230 as well as the number of phonemes 220 within the corresponding syllable 230. For each syllable 230, the respective syllable embeddings 232, 234 may be concatenated and encoded with respective syllable-level linguistic features 236, 236Aa-Cb for the corresponding syllable 230. Moreover, each syllable embedding 232, 234 is indicative of a corresponding state for the level of syllables 230.

With continued reference to FIG. 2A, the blocks in the hierarchical layers that include a diagonal hatching pattern correspond to linguistic features (except for the word level 240) for a particular level of the hierarchy. The hatching pattern at the word-level 240 corresponds to WP embeddings 242 output from the BERT model 270 based on word units 272 obtained from the transcript 206. Since the recurrent neural network (RNN) portion of the encoder 320 has no notion of workpieces, the WP embedding 242 corresponding to the first wordpiece of each word may be selected to represent the word which may contain one or more syllables 230. With the frame-based syllable embeddings 232 and the phone feature-based syllable embeddings 234, the encoder portion 310 concatenates and encodes these syllable embeddings 232, 234 with other linguistic features 236, 252 and WP embeddings 242. For example, the encoder portion 310 encodes the concatenated syllable embeddings 232, 234 with syllable-level linguistic features 236, 236Aa-Cb, WP embeddings 242, 242A-C output from the BERT model 270, and/or sentence-level linguistic features 252, 252A. By encoding the syllable embeddings 232, 234 with the linguistic features 236, 252 and WP embeddings 242, the encoder portion 310 generates an utterance embedding 204 for the reference audio signal 202. The utterance embedding 204 may be stored in the data storage 130 (FIG. 1) along with the respective transcript 206 (e.g., textual representation) of the reference audio signal 204. From the transcript 206, the linguistic features 222, 236, 252 may be extracted and stored for use in conditioning the training of the hierarchical linguistic structure 200. Similarly, the transcript 206 may be split into WP units 272 by a BERT tokenizer, and run through a transformer graph to output an embedding 242 for each WP unit 272 that may be stored for use in conditioning the training of the hierarchical linguistic structure 200. The linguistic features (e.g., linguistic features 222, 236, 252) may include, without limitation, individual sounds for each phoneme and/or the position of each phoneme in a syllable, whether each syllable is stressed or un-stressed, and whether the utterance is a question or phrase and/or a gender of a speaker of the utterance.

In the example of FIG. 2A, encoding blocks 322, 322Aa-Cb are shown to depict the encoding between the WP representations 242, the linguistic features 236, 252 and the syllable embeddings 232, 234. Here, the blocks 322 are sequence encoded at a syllable rate to generate the utterance embedding 204. As an illustration, the first block 322Aa is fed as an input into a second block 322Ab. The second block 322Ab is fed as an input into a third block 322Ba. The third block 322Ca is fed as an input into the fourth block 322Ca. The fourth block 322Ca is fed into the fifth block 322Cb. In some configurations, the utterance embedding 204 includes a mean μ and a standard deviation σ for each reference audio signal 202 where the mean μ and the standard deviation σ are with respect to the training data of multiple reference audio signals 202.

In some implementations, each syllable 230 receives, as input, a corresponding encoding of a subset of reference frames 210 and includes a duration equal to the number of reference frames 210 in the encoded subset. In the example shown, the first seven fixed-length reference frames 210 are encoded into syllable 230Aa; the next four fixed-length reference frames 210 are encoded into syllable 230Ab; the next eleven fixed-length reference frames 210 are encoded into syllable 230Ba; the next three fixed-length reference frames 210 are encoded into syllable 230Ca; and the final six fixed-length reference frames 210 are encoded into syllable 230Cb. Thus, each syllable 230 in the sequence of syllables 230 may include a corresponding duration based on the number of reference frames 210 encoded into the syllable 230 and corresponding pitch and/or energy contours. For instance, syllable 230Aa includes a duration equal to 35 ms (i.e., seven reference frames 210 each having the fixed-length of five milliseconds) and syllable 230Ab includes a duration equal to 20 ms (i.e., four reference frames 210 each having the fixed-length of five milliseconds). Thus, the level of reference frames 210 clocks a total of ten times for a single clocking between the syllable 230Aa and the next syllable 230Ab at the level of syllables 230. The duration of the syllables 230 may indicate timing of the syllables 230 and pauses in between adjacent syllables 230.

In some examples, the utterance embedding 204 generated by the encoder portion 310 is a fixed-length utterance embedding 204 that includes a numerical vector representing a prosody of the reference audio signal 202. In some examples, the fixed-length utterance embedding 204 includes a numerical vector having a value equal to "128" or "256" The encoder portion 310 may encode a plurality of reference audio signals 202 each corresponding to a same spoken utterance/phrase, but with varying prosodies, i.e., each reference audio signal 202 conveys the same utterance but is spoken differently.

Figure 2B:
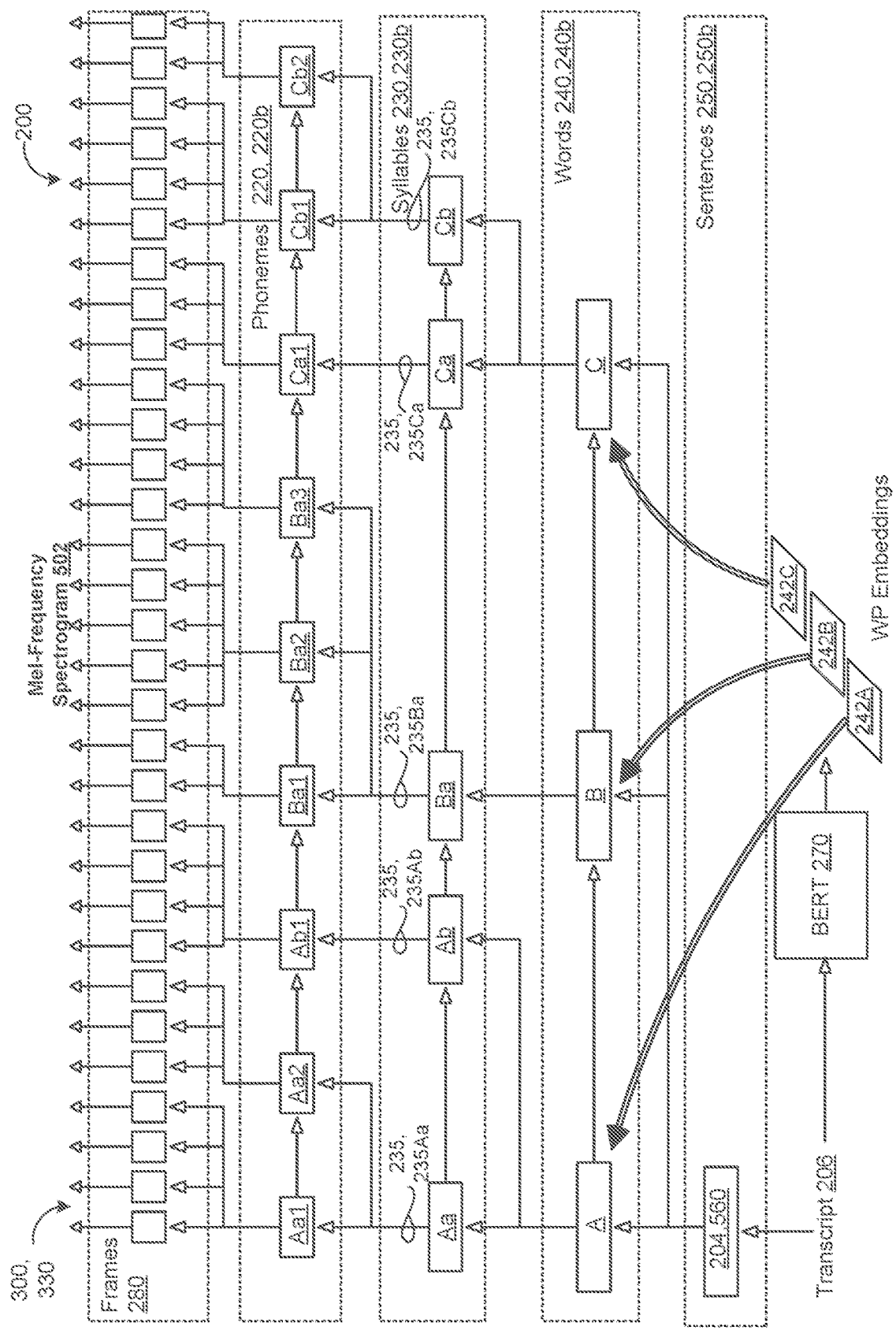
FIG. 2B is a schematic view of a hierarchical linguistic structure using a fixed-length utterance embedding and a BERT model to predict a prosodic representation of a text utterance.

Referring to FIG. 2B, the decoder portion 330 of the variational autoencoder 300 is configured to produce a plurality of fixed-length syllable embeddings 235 by initially decoding a fixed-length utterance embedding 204 that represents a prosody for an utterance. During training, the utterance embedding 204 may include the utterance embedding 204 output from the encoder portion 310 of FIG. 2A by encoding the plurality of fixed-length reference frames 210 sampled from the reference audio signal 202. Thus, the decoder portion 330 is configured to back-propagate the utterance embedding 204 during training to generate the plurality of fixed-length predicted frames 280 that closely match the plurality of fixed-length reference frames 210. For instance, fixed-length predicted frames 280 for both pitch (F0) and energy (C0) may be generated in parallel to represent a target prosody (e.g., predicted prosody) that substantially matches the reference prosody of the reference audio signal 202 input to the encoder portion 310 as training data. In some examples, a TTS system 150 (FIG. 1) uses the fixed-length predicted frames 280 to produce synthesized speech 152 with a selected prosody based on the fixed-length utterance embedding 204. For instance, a unit selection module or a WaveNet module of the TTS system 150 may use the frames 280 to produce the synthesized speech 152 having the intended prosody.

In the example shown, the decoder portion 330 decodes the utterance embedding 204 (e.g., numerical value of "256") received from the encoder portion 302 (FIG. 2A or 2C) into hierarchical levels of words 240, 240b, syllables 230, 230b, phonemes 220, 220b, and the fixed-length predicted frames 280. Specifically, the fixed-length utterance embedding 204 corresponds to a variational layer of hierarchical input data for the decoder portion 330 and each of the stacked hierarchical levels include Long Short-Term Memory (LSTM) processing cells variably clocked to a length of the hierarchical input data. For instance, the syllable level 230 clocks faster than the word level 240 and slower than the phoneme level 220. The rectangular blocks in each level correspond to LSTM processing cells for respective words, syllables, phonemes, or frames. Advantageously, the autoencoder 300 gives the LSTM processing cells of the word level 240 memory over the last 100 words, gives the LSTM cells of the syllable level 230 memory over the last 100 syllables, gives the LSTM cells of the phoneme level 220 memory over the last 100 phonemes, and gives the LSTM cells of the fixed-length pitch and/or energy frames 280 memory over the last 100 fixed-length frames 280. When the fixed-length frames 280 include a duration (e.g., frame rate) of five milliseconds each, the corresponding LSTM processing cells provide memory over the last 500 milliseconds (e.g., a half second).

In the example shown, the decoder portion 330 of the hierarchical linguistic structure 200 simply back-propagates the fixed-length utterance embedding 204 encoded by the encoder portion 310 into the sequence of three words 240A-240C, the sequence of five syllables 230Aa-230Cb, and the sequence of nine phonemes 220Aa1-220Cb2 to generate the sequence of predicted fixed-length frames 280. The decoder portion 330 is conditioned upon linguistic features of the input text 206 and WP embeddings 242 generated by the BERT model 270 based on the input text 206. By contrast to the encoder portion 310 of FIG. 2A where outputs from faster clocking layers are received as inputs by slower clocking layers, the decoder portion 330 includes outputs from slower clocking layers feeding faster clocking layers such that the output of a slower clocking layer is distributed to the input of the faster clocking layer at each clock cycle with a timing signal appended thereto.

Figure 3A:
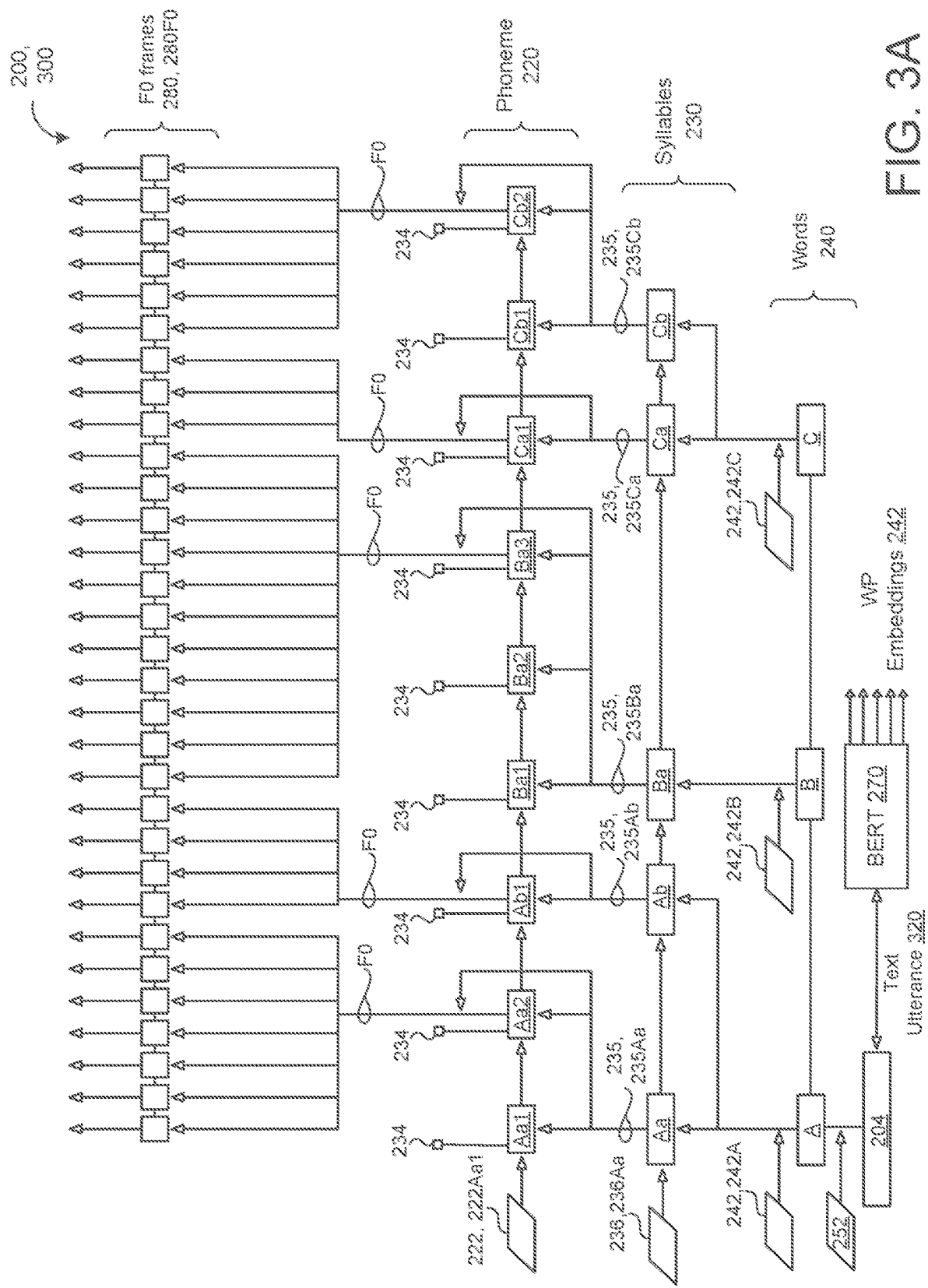
FIG. 3A is a schematic view of an example autoencoder for predicting duration and pitch contours for each syllable of a text utterance.
Figure 3B:
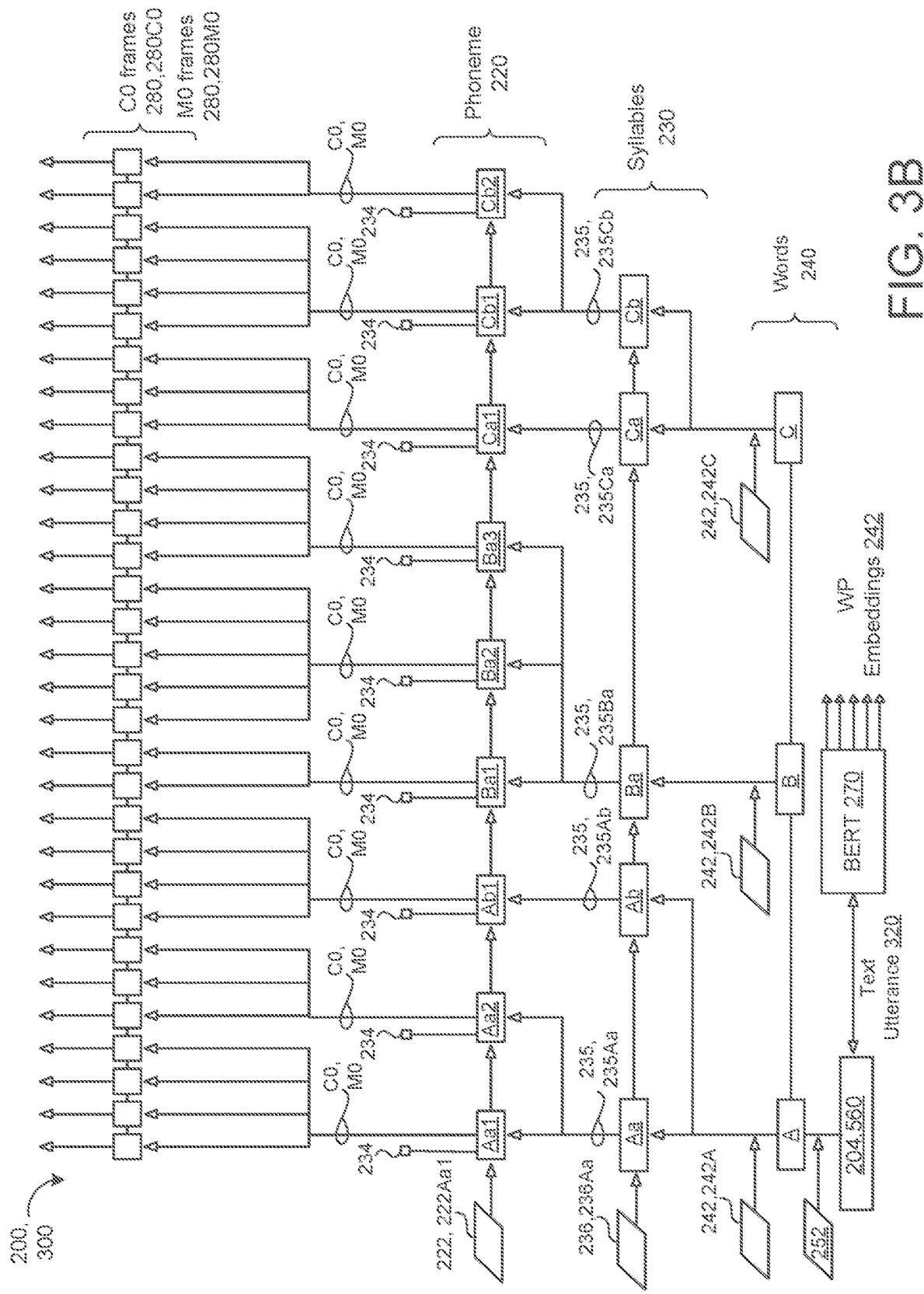
FIG. 3B is a schematic view of an example autoencoder for predicting duration and energy contours for each phoneme of a text utterance.

Referring to FIGS. 3A and 3B, in some implementations, the autoencoder 300 uses the hierarchical linguistic structure 200 to predict a prosodic representation 322 for a given text utterance 320 during inference by jointly predicting durations of phonemes 220 and pitch and/or energy contours for each syllable 230 of the given text utterance 320. Since the text utterance 320 does not provide any context, semantic information, or pragmatic information to indicate an appropriate prosody for the text utterance, the autoencoder 300 selects an utterance embedding 206 as a latent variable to represent an intended prosody for the text utterance 320. The autoencoder 300 is further conditioned on WP embeddings 242 produced by the BERT model 270 from a sequence of word units 272 split from the text utterance 320. In addition to conveying syntactic information implicitly, the WP embeddings 242 provide the autoencoder 300 with semantic information and world knowledge associated with each word to help the autoencoder 300 correctly pronounce each word in the text utterance 320 with the intended prosody.

The utterance embedding 204 may be selected from the utterance embedding data storage 180 (FIG. 1). Each utterance embedding 204 in the storage 180 may be encoded by the encoder portion 310 (FIG. 2A) from a corresponding variable-length reference audio signal 202 (FIG. 2A) during training. Specifically, the encoder portion 310 compresses prosody of variable-length reference audio signals 202 into fixed-length utterance embeddings 204 during training and stores each utterance embedding 204 together with a transcript 206 of the corresponding reference audio signal 202 in the utterance embedding data storage 180 for use by the decoder portion 330 at inference. In the example shown, the autoencoder 300 may first locate utterance embeddings 204 having transcripts 206 that closely match the text utterance 320 and then select one of the utterance embeddings 204 to predict the prosodic representation 322 (FIG. 1) for the given text utterance 320. In some examples, the fixed-length utterance embedding 204 is selected by picking a specific point in a latent space of embeddings 204 that likely represents particular semantics and pragmatics for a target prosody. In other examples, the latent space is sampled to choose a random utterance embedding 204 for representing the intended prosody for the text utterance 320. In yet another example, the autoencoder 300 models the latent space as multidimensional unit Gaussian by choosing a mean of the utterance embeddings 204 having closely matching transcripts 206 for representing a most likely prosody for the linguistic features and WP embeddings associated with the text utterance 320. If the prosody variation of the training data is reasonably neutral, the last example of choosing the mean of utterance embeddings 206 is a reasonable choice.

FIG. 3A shows the text utterance 320 having three words 240A, 240B, 240C represented in the word level 240 of the hierarchical linguistic structure 200. The first word 240A contains syllables 230Aa, 230Ab, the second word 240B contains one syllable 230Ba, and the third word 240C contains syllables 230Ca, 230Cb. Accordingly, the syllable level 230 of the hierarchical linguistic structure 200 includes a sequence of five syllables 230Aa-230Cb of the text utterance 320. At the syllable level 230 of LTSM processing cells, the autoencoder 300 is configured to produce/output a corresponding syllable embedding 235Aa, 235Ab, 235Ba, 235Ca, 235Cb for each syllable 230 from the following inputs: the fixed-length utterance embedding 204; utterance-level linguistic features 252 associated with the text utterance 320; WP embeddings 242 produced by the BERT model 270 and associated with the word 240 that contains the syllable 230, and syllable-level linguistic features 236 for the syllable 230. The utterance-level linguistic features 252 may include, without limitation, whether or not the text utterance 320 is a question, an answer to a question, a phrase, a sentence, a gender of a speaker, etc. The syllable-level linguistic features 242 may include, without limitation, whether the syllable 240 is stressed or unstressed.

In the example shown, each syllable 230Aa, 230Ab, 230Ba, 230Ca, 230Cb in the syllable level 230 may be associated with a corresponding LTSM processing cell that outputs a corresponding syllable embedding 235Aa, 235Ab, 235Ba, 235Ca, 235Cb to the faster clocking phoneme level 220 for decoding the individual fixed-length predicted pitch (F0) frames 280, 280F0 (FIG. 3A) and for decoding the individual fixed-length predicted energy (C0) frames 280, 280C0 (FIG. 3B) in parallel. FIG. 3A shows each syllable in the syllable level 230 including a plurality of fixed-length predicted pitch (F0) frames 280F0 that indicate a duration (timing and pauses) and a pitch contour for the syllable 230. Here, the duration and pitch contour correspond to a prosodic representation of the syllable 230. FIG. 3B shows each phoneme in the phoneme level 220 including a plurality of fixed-length predicted energy (C0) frames 280C0 that indicate a duration and an energy contour for the phoneme. Optionally, each phoneme in the phoneme level 220 of FIG. 3B may include a plurality of fixed-length predicted spectral characteristics (M0) frames 280M0 that indicate a duration and mel-frequency spectrogram contour for the phoneme.

The first syllable 230Aa (i.e., LTSM processing cell Aa) in the syllable level 230 receives the fixed-length utterance embedding 204, utterance-level linguistic features 252 associated with the text utterance 320, a WP embedding 242A produced by the BERT model 270 and associated with the first word 240A, and the syllable-level linguistic features 236Aa for the syllable 236Aa as inputs for producing the corresponding syllable embedding 235Aa. The second syllable 230Ab in the syllable level 230 receives the fixed-length utterance embedding 204, the utterance-level linguistic features 252 associated with the text utterance 320, the WP embedding 242A produced by the BERT model 270 associated with the first word 240A, and corresponding syllable-level linguistic features 236 (not shown) for the syllable 230Ab as inputs for producing the corresponding syllable embedding 235Ab. While the example only shows syllable-level linguistic features 232 associated with the first syllable 230Aa, the corresponding syllable-level linguistic features 232 associated with each other syllable 230Ab- 230Cb in the syllable level 230 are only omitted from the views of FIGS. 3A and 3B for the sake of clarity.

For simplicity, the corresponding syllable-level linguistic features 236 input to the processing block for syllable 230Ab are not shown. The LTSM processing cell (e.g., rectangle Ab) associated with the second syllable 230Ab also receives the state of the preceding first syllable 230Aa. The remaining sequence of syllables 230Ba, 230Ca, 230Cb in the syllable level 230 each produce corresponding syllable embeddings 235Ba, 235Ca, 235Cb in a similar manner. For simplicity, the corresponding syllable-level linguistic features 236 input to the processing block for each of the syllables 230Ba, 230Ca, 230Cb are not shown. Moreover, each LTSM processing cell of the syllable level 230 receives the state of the immediately preceding LTSM processing cell of the syllable level 240. FIGS. 3A and 3B further show the BERT model 270 producing a sequence of WP embeddings 242 for the text utterance 320. Here, WP embedding 242A associated with the first word 240A is broadcast to the processing block for each of the syllables 230Aa, 230Ab in the first word 240A, WP embedding 242B associated with the second word 240B is input to the processing block for syllable 230Ba, and WP) embedding 242C is broadcast to the processing block for each of the syllables 230Ca, 230Cb.

Referring to FIG. 3A, the phoneme level 220 of the hierarchical linguistic structure 200 includes the sequence of nine phonemes 220Aa1-220Cb2 each associated with a corresponding predicted phoneme duration 234. Moreover, the autoencoder 300 encodes the phoneme-level linguistic features 222 associated with each phoneme 220Aa1-220Cb2 with the corresponding syllable embedding 235 for predicting the corresponding predicted phoneme duration 234 and for predicting the corresponding pitch (f0) contour for the syllable containing the phoneme. The phoneme-level linguistic features 222 may include, without limitation, an identity of sound for the corresponding phoneme 230 and/or a position of the corresponding phoneme 230 in the syllable that contains the phoneme. While the example only shows phoneme-level linguistic features 222 associated with the first phoneme 220Aa1, the phoneme-level linguistic features 222 associated with the other phonemes 220Aa2-220Cb2 in the phoneme level 220 are only omitted from the views of FIGS. 3A and 3B for the sake of clarity.

The first syllable 230Aa contains phonemes 220Aa1, 220Aa2 and includes a predicted syllable duration equal to the sum of the predicted phone durations 234 for the phonemes 220Aa1, 220Aa2 Here, the predicted syllable duration for the first syllable 230Aa determines the number of fixed-length predicted pitch (F0) frames 280F0 to decode for the first syllable 230Aa. In the example shown, the autoencoder 300 decodes a total of seven fixed-length predicted pitch (F0) frames 280F0 for the first syllable 230Aa based on the sum of the predicted phoneme durations 234 for the phonemes 220Aa1, 220Aa2 Accordingly, the faster clocking syllable layer 230 distributes the first syllable embedding 235Aa as an input to each phoneme 220Aa1, 220Aa2 included in the first syllable 230Aa A timing signal may also be appended to the first syllable embedding 235Aa. The syllable level 230 also passes the state of the first syllable 230Aa to the second syllable 230Ab.

The second syllable 230Ab contains a single phoneme 220Ab1 and therefore includes a predicted syllable duration equal to the predicted phoneme duration 234 for the phoneme 220Ab1. Based on the predicted syllable duration for the second syllable 230Ab, the autoencoder 300 decodes a total of four fixed-length predicted pitch (F0) frames 280F0 for the second syllable 230Ab. Accordingly, the faster clocking syllable layer 230 distributes the second syllable embedding 235Ab as an input to the phoneme 220Ab1. A timing signal may also be appended to the second syllable embedding 235Aa. The syllable level 230 also passes the state of the second syllable 230Ab to the third syllable 230Ba.

The third syllable 230Ba contains phonemes 220Ba1, 220Ba2, 220Ba3 and includes a predicted syllable duration equal to the sum of the predicted phoneme durations 234 for the phonemes 220Ba1, 220Ba2, 220Ba3. In the example shown, the autoencoder 300 decodes a total of eleven fixed-length predicted pitch (F0) frames 280F0 for the third syllable 230Ba based on the sum of the predicted phoneme durations 234 for the phonemes 220Ba1, 220Ba2, 220Ba3. Accordingly, the faster clocking syllable layer 230 distributes the third syllable embedding 235Ba as an input to each phoneme 220Ba1, 220Ba2, 220Ba3 included in the third syllable 230Ba. A timing signal may also be appended to the third syllable embedding 235Ba. The syllable level 230 also passes the state of the third syllable 230Ba to the fourth syllable 230Ca.

The fourth syllable 230Ca contains a single phoneme 220Ca1 and therefore includes a predicted syllable duration equal to the predicted phoneme duration 234 for the phoneme 220Ca1. Based on the predicted syllable duration for the fourth syllable 230Ca, the autoencoder 300 decodes a total of three fixed-length predicted pitch (F0) frames 280F0 for the fourth syllable 230Ca. Accordingly, the faster clocking syllable layer 240 distributes the fourth syllable embedding 235Ca as an input to the phoneme 220Ca1. A timing signal may also be appended to the fourth syllable embedding 235Ca. The syllable level 230 also passes the state of the fourth syllable 230Ba to the fifth syllable 230Cb.

Lastly, the fifth syllable 230Cb contains phonemes 220Cb1, 220Cb2 and includes a predicted syllable duration equal to the sum of the predicted phoneme durations 234 for the phonemes 220Cb1, 220Cb2. In the example shown, the autoencoder 300 decodes a total of six fixed-length predicted pitch (F0) frames 280F0 for the fifth syllable 230Cb based on the sum of the predicted phoneme durations 234 for the phonemes 220Cb1, 220Cb2. Accordingly, the faster clocking syllable layer 230 distributes the fifth syllable embedding 235Cb as an input to each phoneme 220Cb1, 220Cb2 included in the fifth syllable 230Cb A timing signal may also be appended to the fifth syllable embedding 235Cb.

Still referring to FIG. 3A, the autoencoder 300 similarly decodes each of the remaining syllable embeddings 235Ab, 235Ba, 235Ca, 235Cb output from the syllable level 230 into individual fixed-length predicted pitch (F0) frames 280 for each corresponding syllable 230Ab, 230Ba, 230Ca, 230Cb. For instance, the second syllable embedding 235Ab is further combined at the output of the phoneme level 220 with the encoding of the second syllable embedding 235Ab and the corresponding phoneme-level linguistic features 222 associated with the phoneme 220Ab1, while the third syllable embedding 235Ba is further combined at the output of the phoneme level 220 with the encodings of the third syllable embedding 235Ba and the corresponding phoneme-level linguistic features 222 associated with each of the phonemes 220Ba1, 22013a2, 220Ba3. Moreover, the fourth syllable embedding 235Ca is further combined at the output of the phoneme level 220 with the encodings of the fourth syllable embedding 235Ca and the corresponding phoneme-level linguistic features 222 associated with the phoneme 220Ca1, while the fifth syllable embedding 235Cb is further combined at the output of the phoneme level 220 with the encodings of the fifth syllable embedding 235Cb and the corresponding phoneme-level linguistic features 222 associated with each of the phonemes 220Cb1, 220Cb2. While the fixed-length predicted pitch (F0) frames 280F0 generated by the autoencoder 300 include frame-level LSTM, other configurations may replace the frame-level LSTM of pitch (F0) frames 280F0 with a feed-forward layer so that the pitch (F0) of every frame in a corresponding syllable is predicted in one pass.

Referring now to FIG. 3B, the autoencoder 300 is further configured to encode the phoneme-level linguistic features 222 associated with each phoneme 220Aa1-220Cb2 with the corresponding syllable embedding 235 for predicting the corresponding energy (C0) contour for each phoneme 220. The phoneme-level linguistic features 222 associated with phonemes 220Aa2-220Cb2 in the phoneme level 220 are only omitted from the view of FIG. 3B for the sake of clarity. The autoencoder 300 determines the number of fixed-length predicted energy (C0) frames 280, 280C0 (or optionally fixed-length spectral characteristics (M0) frames 280, 280M0) to decode for each phoneme 220 based on the corresponding predicted phoneme duration 234. For instance, the autoencoder 300 decodes/generates four (4) predicted energy (C0) frames 280C0 for the first phoneme 220Aa1, three (3) predicted energy (C0) frames 280C0 for the second phoneme 220Aa2, four (4) predicted energy (C0) frames 280C0 for the third phoneme 220Ab1, two (2) predicted energy (C0) frames 280C0 for the fourth phoneme 220Ba1, five (5) predicted energy (C0) frames 280C0 for the fifth phoneme 220Ba2, four (4) predicted energy (C0) frames 280C0 for the sixth phoneme 220Ba3, three (3) predicted energy (C0) frames 280C0 for the seventh phoneme 220Ca1, four (4) predicted energy (C0) frames 280C0 for the eighth phoneme 220Cb1, and two (2) predicted energy (C0) frames 280C0 for the ninth phoneme 220Cb2. Accordingly, as with the predicted phoneme duration 234, the predicted energy contour for each phoneme in the phoneme level 220 is based on an encoding between the syllable embedding 235 input from the corresponding syllable in the slower clocking syllable level 230 that contains the phoneme and the linguistic features 222 associated with the phoneme.

Figure 4:
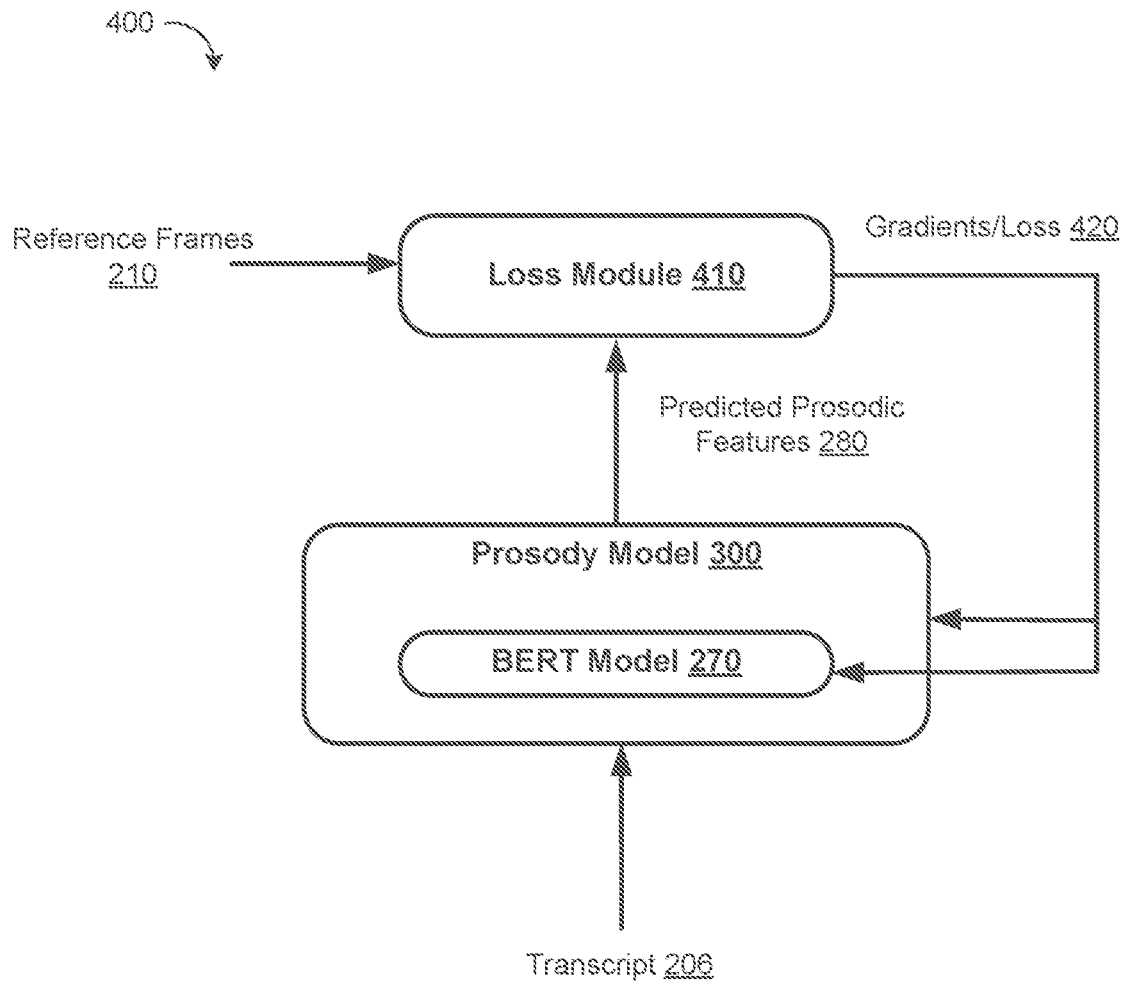
FIG. 4 is a schematic view of updating parameters of a pre-trained BERT model based on speech-domain outputs predicted by a prosody model.

FIG. 4 is an example process 400 for training the prosody model 300 that incorporates the BERT model 270. As the BERT model 270 is run as part of the full prosody model 300, the process 400 also updates parameters of the pre-trained BERT model 270 based on prosodic representations 322 (e.g., prosodic acoustic features 280) output by the prosody model 300. As an example, the prosody model 300 incorporating the BERT model 270 may be trained to learn to predict prosodic features 280 (e.g., pitch F0, energy C0, and phone duration) for a piece of input text (e.g., reference transcript 206 of an utterance) using a selected utterance embedding 204. The process 400 executes a loss module 410 configured to generate gradients/losses 420 between predicted prosodic features 280 output by the prosody model 300 and reference frames 210 sampled from a reference audio signal 202 (e.g., utterance) associated with the transcript 206. Here, the gradients/losses 420 may back-propagate through the prosody model 300 to update parameters until the prosody model 300 is fully trained. Moreover, the gradients/losses 420 are used to fine-tune the BERT Model 270 based on speech-domain data.

As previously mentioned, the BERT model may be pre-trained on text initially, and then parameters of the BERT model may be fine-tuned on a speech synthesis task, i.e., based gradients/losses associated predicted prosodic features output by the model. In some examples, after pre-training the BERT model on the language modeling task, the process 400 may freeze the WP embedding lookup table (e.g., WP embedding layer) of the BERT model 270 since not all wordpieces observed during training will be observed (as often) during the fine-tuning stage. By doing so, gradients may flow through the BERT model 270 during the fine-tuning stage up until, but not including, the WP embedding lookup table. The following table compares the prosody model 300 incorporating the same BERT model 270 without fine-tuning

TABLE 1

|  | | test outcome | t-statistic | df |
|---|---|---|---|---|
| Hard lines | ♀ | 0.320 ± 0.069 | 9.0954 | 1143 |
|  | ♂ | 0.642 ± 0.072 | 17.5341 | 1143 |
| Questions | ♀ | 0.238 ± 0.082 | 5.7296 | 1199 |
|  | ♂ | 0.504 ± 0.083 | 11.9680 | 1199 |
| Generic lines | ♀ | 0.208 ± 0.054 | 7.6238 | 911 |
|  | ♂ | 0.588 ± 0.068 | 16.8985 | 911 |

Table 1 reveals that fine-tuning the BERT model 270 portion of the prosody model 300 by allowing gradients 420 to flow through, yields better results than the exact same prosody model 300 where no gradients 420 flow through the BERT model 270 portion at all.

While larger BERT models typically yield better results than smaller BERT models for natural language processing (NLP) tasks, the prosody model yields higher losses 420 in terms of pitch F0 in Hz when incorporating larger BERT models than smaller BERT models pre-trained on the same dataset. The following table depicts Mean absolute F0 error in Hz, for the prosody model 300 incorporating BERT models 270 of different sizes

TABLE 2

| hidden state | interm. state | # attention heads | # Transformer layers | $F_0$ error |
|---|---|---|---|---|
| 24 | 96 | 1 | 2 | 20.7 |
| 128 | 512 | 2 | 2 | 18.11 |
| 128 | 512 | 2 | 4 | 17.77 |
| 256 | 1024 | 4 | 2 | 17.59 |
| 256 | 1024 | 4 | 4 | 22.28 |
| 768 | 3072 | 12 | 6 | 22.51 |
| 768 | 3072 | 12 | 8 | 22.66 |

Referring back to FIGS. 1, 2A, 2B, and 3B, in some implementations, the hierarchical linguistic structure (e.g., deep neural network of FIG. 1) 200 for the clockwork hierarchical variational autoencoder 300 is adapted to provide a controllable model for predicting mel spectral information for an input text utterance 320 (FIG. 1), while at the same time effectively controlling the prosody implicitly represented in the mel spectral information. Specifically, the autoencoder 300 may predict a mel-frequency spectrogram 502 for the input text utterance (simply referred to as "input text" 320) and provide the mel-frequency spectrogram 502 as input to a vocoder network 155 of the TTS system 150 for conversion into a time-domain audio waveform. A time-domain audio waveform includes an audio waveform that defines an amplitude of an audio signal over time. As will become apparent, the TTS system 150 can generate synthesized speech 152 from input text 320 using the autoencoder 300 trained on sample input text and corresponding mel-frequency spectrograms 502 of human speech alone. That is, the autoencoder model 300 does not receive complex linguistic and acoustic features that require significant domain expertise to produce, but rather is able to convert input text 320 to mel-frequency spectrograms 502 using an end-to-end deep neural network (e.g., hierarchical linguistic structure) 200. The vocoder network 155, i.e., neural vocoder, is separately trained and conditioned on mel-frequency spectrograms for conversion into time-domain audio waveforms.

A mel-frequency spectrogram includes a frequency-domain representation of sound. Mel-frequency spectrograms emphasize lower frequencies, which are critical to speech intelligibility, while de-emphasizing high frequency, which are dominated by fricatives and other noise bursts and generally do not need to be modeled with high fidelity. The vocoder network 155 can be any network that is configured to receive mel-frequency spectrograms and generate audio output samples based on the mel-frequency spectrograms. For example, the vocoder network 155 can be, or can be based on the parallel feed-forward neural network described in van den Oord, *Parallel WaveNet: Fast High-Fidelity Speech Synthesis*, available at https://arxiv.org/pdf/1711.10433.pdf, and incorporated herein by reference. Alternatively, the vocoder network 155 can be an autoregressive neural network.

As described above with reference to FIGS. 2A and 2B, the autoencoder 300 includes an encoder portion 310 and a decoder portion 330. The encoder portion 310 is configured to encode a plurality of fixed-length reference mel-frequency spectrogram frames 220 sampled/extracted from a reference audio signal 202 into a fixed-length mel spectral embedding 560. The decoder portion 330 is configured to learn how to decode the fixed-length mel spectral embedding 560 into a plurality of fixed-length predicted mel-frequency spectrogram frames 280M0 (FIG. 3B). The autoencoder may be trained so that the number of predicted mel-frequency spectrogram frames 280 output from the decoder portion 330 is equal to the number of reference mel-frequency spectrogram frames 520 input to the encoder portion 302. Moreover, the autoencoder is trained so that data associated with the reference and predicted mel-frequency spectrogram frames 220, 280 substantially match one another. The predicted mel-frequency spectrogram frames 280 may implicitly provide a prosodic representation of the reference audio signal 202.

Figure 5:
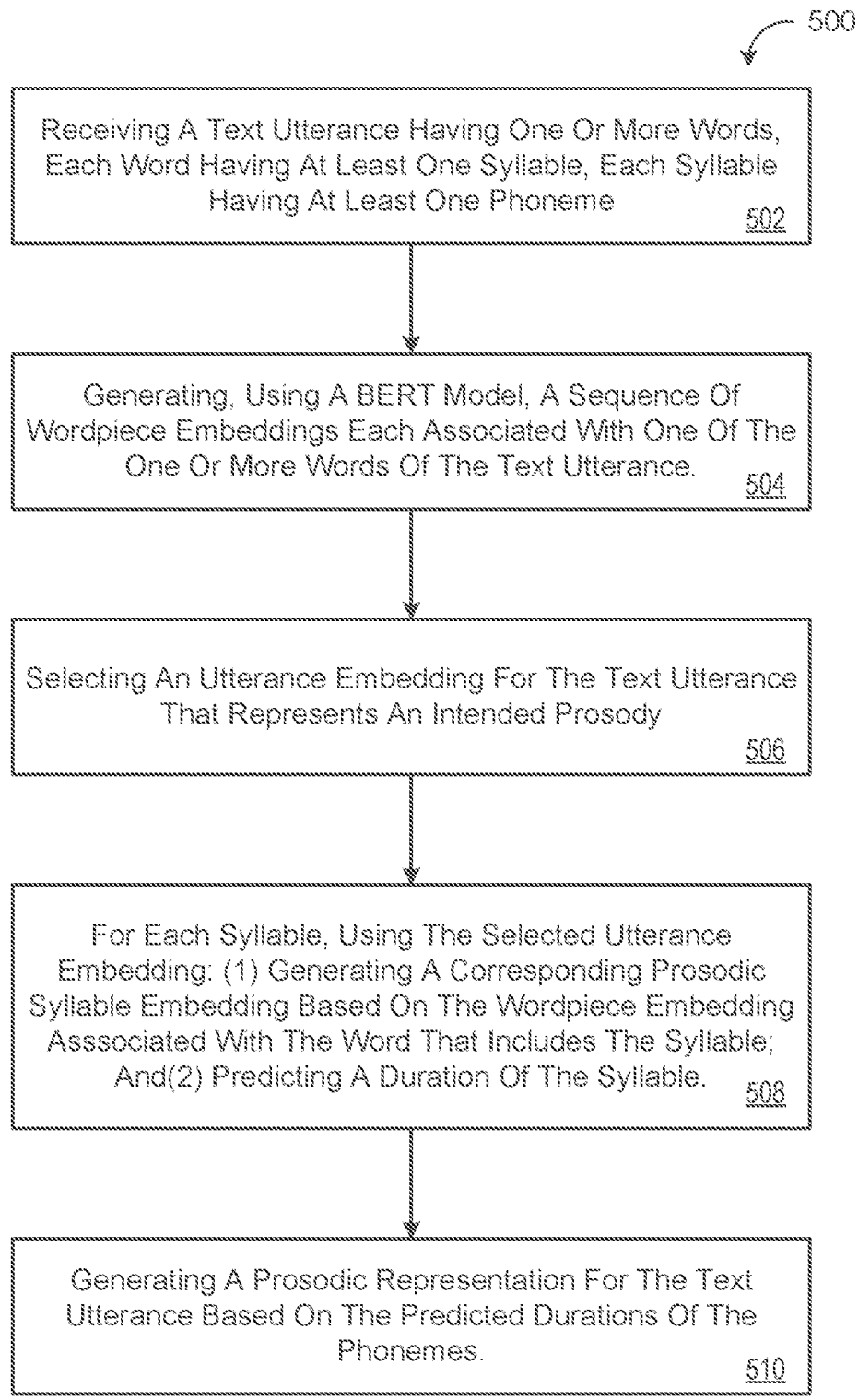
FIG. 5 is a flowchart of an example arrangement of operations for a method of predicting a prosodic representation of a received text utterance.

FIG. 5 is a flowchart of an example arrangement of operations for a method 500 of predicting a prosodic representation 322 for a text utterance 320. The method 500 may be described with reference to FIGS. 1-3C. The memory hardware 124 residing on the computer system 120 of FIG. 1 may store instructions that when executed by the data processing hardware 122 cause the data processing hardware 122 to execute the operations for the method 400. At operation 502, the method 400 includes receiving the text utterance 320. The text utterance 320 has at least one word, each word having at least one syllable, each syllable having at least one phoneme.

At operation 504, the method includes generating, using a Bidirectional Encoder Representations from Transformers (BERT) model 270, a sequence of wordpiece embeddings 242, each wordpiece embedding associated with one of the one or more words of the text utterance. At operation 506, the method includes selecting an utterance embedding 204 for the text utterance 320. The utterance embedding 204 represents an intended prosody. As used herein, the selected utterance embedding 204 is used to predict the prosodic representation 322 of the text utterance 320 for use by a TTS system 150 to produce synthesized speech 152 from the text utterance 320 and having the intended prosody. The utterance embedding 260 may be represented by a fixed-length numerical vector.

At operation 508, for each syllable, using the selected utterance embedding 204 and a prosody model 300 that incorporates the BERT model 270, the method also includes generating a corresponding prosodic syllable embedding for the syllable based on the wordpiece embedding associated with the word that includes the syllable and predicting a duration of the syllable by encoding linguistic features of each phoneme of the syllable with the corresponding prosodic syllable embedding for the syllable. At operation 510, the method also includes generating, using the prosody model, a prosodic representation for the text utterance based on the predicted durations of the syllables.

Figure 6:
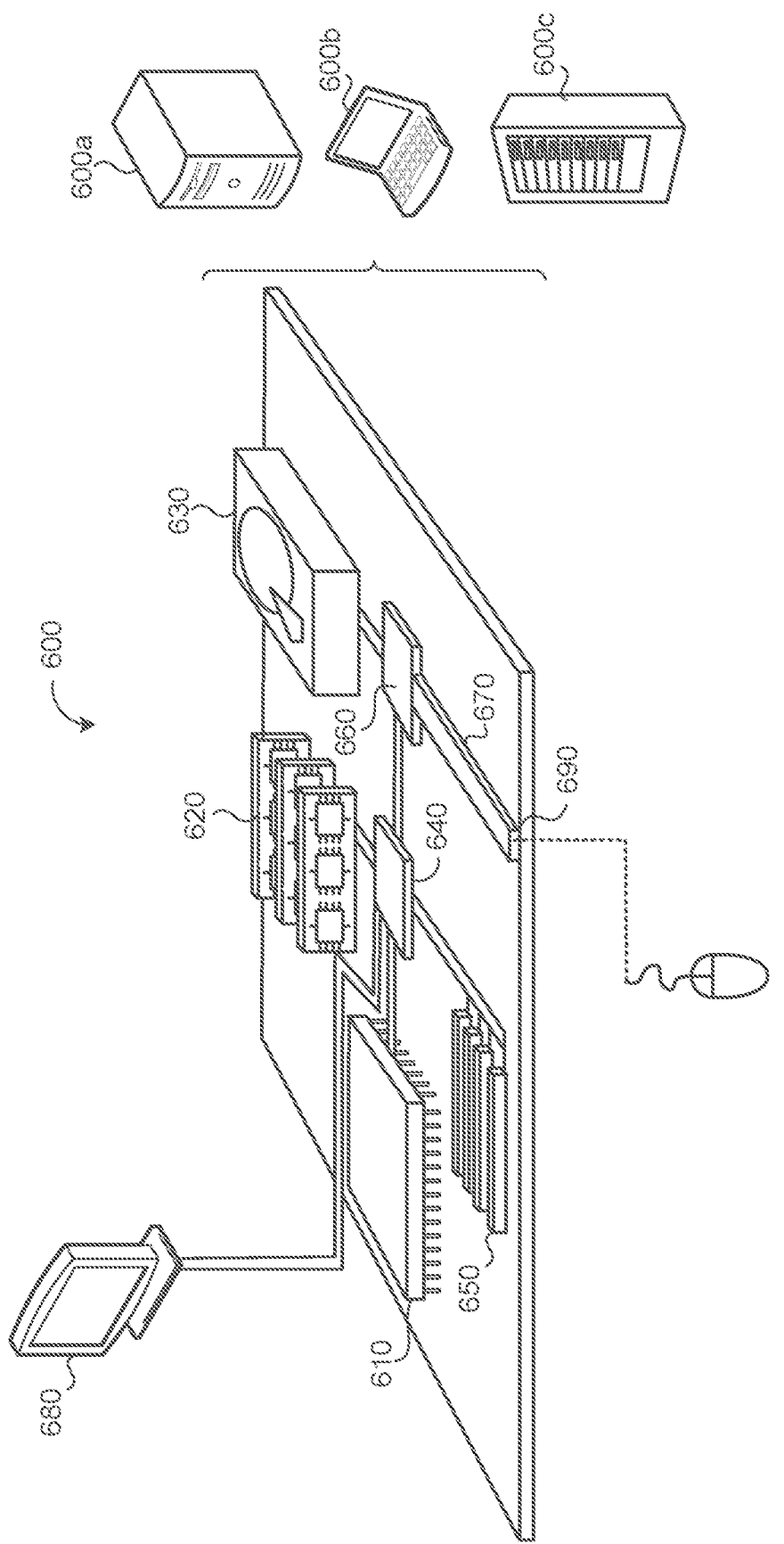
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs) Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit) Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware, a text utterance having one or more words, each word having at least one syllable, each syllable having at least one phoneme;
   splitting, by the data processing hardware, using a tokenizer, the text utterance into a sequence of wordpiece units;
   generating, by the data processing hardware, using a Bidirectional Encoder Representations from Transformers (BERT) model, a sequence of wordpiece embeddings, each wordpiece embedding corresponding to one of the word piece units that are associated with one of the one or more words of the text utterance;
   selecting, by the data processing hardware, an utterance embedding for the text utterance, the utterance embedding representing an intended prosody;

for each syllable, using the selected utterance embedding and a prosody model that incorporates the BERT model:
when the word that includes the syllable includes a plurality of wordpiece units from the sequence of wordpiece units, selecting the single wordpiece embedding from the sequence of wordpiece embeddings that corresponds to the initial wordpiece unit of the plurality of wordpiece units from the sequence of wordpiece units to represent the word that includes the syllable;
generating, by the data processing hardware, a corresponding prosodic syllable embedding for the syllable based on only the selected single wordpiece embedding corresponding to the initial wordpiece unit of the plurality of wordpiece units from the sequence of wordpiece units that includes the syllable that is selected to represent the word that includes the syllable; and
predicting, by the data processing hardware, a duration of the syllable by encoding linguistic features of each phoneme of the syllable with the corresponding prosodic syllable embedding for the syllable; and
generating, by the data processing hardware, using the prosody model, a prosodic representation for the text utterance based on the predicted durations of the syllables.

2. The method of claim 1, further comprising, for each syllable, using the selected utterance embedding and the prosody model:
predicting, by the data processing hardware, a pitch contour of the syllable based on the predicted duration for the syllable; and
generating, by the data processing hardware, a plurality of fixed-length predicted pitch frames based on the predicted duration for the syllable, each fixed-length predicted pitch frame representing part of the predicted pitch contour of the syllable,
wherein generating the prosodic representation for the utterance is based on the plurality of fixed-length predicted pitch frames generated for each syllable.

3. The method of claim 2, further comprising, for each syllable, using the selected utterance embedding and the prosody model:
predicting, by the data processing hardware, an energy contour of each phoneme in the syllable based on a predicted duration for the phoneme; and
for each phoneme associated with the syllable, generating, by the data processing hardware, a plurality of fixed-length predicted energy frames based on the predicted duration for the corresponding phoneme, each fixed-length energy frame representing the predicted energy contour of the corresponding phoneme,
wherein generating the prosodic representation for the utterance is further based on the plurality of fixed-length predicted energy frames generated for each phoneme associated with each syllable.

4. The method of claim 3, wherein a hierarchical linguistic structure represents the text utterance, the hierarchical linguistic structure comprising:
a first level including each syllable of the text utterance;
a second level including each phoneme of the text utterance;
a third level including each fixed-length predicted pitch frame for each syllable of the text utterance; and
a fourth level parallel to the third level and including each fixed-length predicted energy frame for each phoneme of the text utterance.

5. The method of claim 4, wherein:
the first level of the hierarchical linguistic structure comprises a long short-term memory (LSTM) processing cell representing each syllable of the text utterance;
the second level of the hierarchical linguistic structure comprises a LSTM processing cell representing each phoneme of the text utterance, the LSTM processing cells of the second level clocking relative to and faster than the LSTM processing cells of the first level;
the third level of the hierarchical linguistic structure comprises a LSTM processing cell representing each fixed-length predicted pitch frame, the LSTM processing cells of the third level clocking relative to and faster than the LSTM processing cells of the second level; and
the fourth level of the hierarchical linguistic structure comprises a LSTM processing cell representing each fixed-length predicted energy frame, the LSTM processing cells of the fourth level clocking at the same speed as the LSTM processing cells of the third level and clocking relative to and faster than the LSTM processing cells of the second level.

6. The method of claim 3, wherein the lengths of the fixed-length predicted energy frames and the fixed-length predicted pitch frames are the same.

7. The method of claim 3, wherein a total number of fixed-length predicted energy frames generated for each phoneme of the received text utterance is equal to a total number of the fixed-length predicted pitch frames generated for each syllable of the received text utterance.

8. The method of claim 1, further comprising:
obtaining, by the data processing hardware, the BERT model, the BERT model pre-trained on a text-only language modeling task;
receiving, at the data processing hardware, training data including a plurality of reference audio signals and corresponding transcripts, each reference audio signal comprising a spoken utterance of human speech and having a corresponding prosody, each transcript comprising a textual representation of the corresponding reference audio signal; and
training, by the data processing hardware, using a deep neural network that incorporates the BERT model, the prosody model by encoding each reference audio signal into a corresponding fixed-length utterance embedding representing the corresponding prosody of the reference audio signal.

9. The method of claim 8, wherein encoding each reference audio signal into a corresponding fixed-length utterance embedding comprises:
generating, using the BERT model, a sequence of wordpiece embeddings from the transcript of the corresponding reference audio signal;
sampling, from the corresponding reference audio signal, a sequence of fixed-length reference frames providing a duration, pitch contour, and/or energy contour that represents the corresponding prosody of the reference audio signal; and
for each syllable in the reference audio signal:
encoding phone-level linguistic features associated with each phoneme in the syllable into a phone feature-based syllable embedding;
encoding the fixed-length reference frames associated with the syllable into a frame-based syllable embedding, the frame-based syllable embedding indicative of a duration, pitch, and/or energy associated with the corresponding syllable; and encoding, into a corresponding prosodic syllable embedding for the syllable, the phoneme feature-based and frame-based syllable embeddings with syllable-level linguistic features associated with the syllable, sentence-level linguistic features associated with the reference audio signal, and a wordpiece embedding from the sequence of wordpiece embeddings generated by the BERT model that is associated with a word that includes the corresponding syllable.

10. The method of claim 8, wherein training the prosody model further comprises, for each reference audio signal:

sampling, from the corresponding reference audio signal, a sequence of fixed-length reference frames providing a duration, pitch contour, and/or energy contour that represents the corresponding prosody of the reference audio signal;

decoding, using the transcript of the corresponding reference audio signal, the corresponding fixed-length utterance embedding into a sequence of fixed-length predicted frames representing a prosodic representation of the transcript;

generating gradients/losses between the sequence of fixed-length predicted frames decoded from the corresponding fixed-length utterance embedding and the sequence of fixed-length reference frames sampled; and back-propagating the gradients/losses through the prosody model.

11. The method of claim 10, wherein back-propagating the gradients/losses through the prosody model comprises fine-tuning the pre-trained BERT model by updating parameters of the pre-trained BERT model based on the gradients/losses back-propagating through the prosody model.

12. The method of claim 1, wherein the utterance embedding comprises a fixed-length numerical vector.

13. A system comprising:

data processing hardware; and memory hardware in communication with the data processing hardware, the memory hardware storing instructions that, when executed on the data processing hardware, cause the data processing hardware to perform operations comprising:

receiving a text utterance having one or more words, each word having at least one syllable, each syllable having at least one phoneme;

splitting, by the data processing hardware, using a tokenizer, the text utterance into a sequence of wordpiece units;

generating, using a Bidirectional Encoder Representations from Transformers (BERT) model, a sequence of wordpiece embeddings, each wordpiece embedding corresponding to one of the word piece units that are associated with one of the one or more words of the text utterance;

selecting an utterance embedding for the text utterance, the utterance embedding representing an intended prosody;

for each syllable, using the selected utterance embedding and a prosody model that incorporates the BERT model:

when the word that includes the syllable includes a plurality of wordpiece units from the sequence of wordpiece units, selecting the single wordpiece embedding from the sequence of wordpiece embeddings that corresponds to the initial wordpiece unit of the plurality of wordpiece units from the sequence of wordpiece units to represent the word that includes the syllable;

generating a corresponding prosodic syllable embedding for the syllable based on only the selected single wordpiece embedding corresponding to the initial wordpiece unit of the plurality of wordpiece units from the sequence of wordpiece units that includes the syllable that is selected to represent the word that includes the syllable; and predicting a duration of the syllable by encoding linguistic features of each phoneme of the syllable with the corresponding prosodic syllable embedding for the syllable; and generating, using the prosody model, a prosodic representation for the text utterance based on the predicted durations of the syllables.

14. The system of claim 13, wherein the operations further comprise, for each syllable, using the selected utterance embedding and the prosody model:

predicting a pitch contour of the syllable based on the predicted duration for the syllable; and generating a plurality of fixed-length predicted pitch frames based on the predicted duration for the syllable, each fixed-length predicted pitch frame representing part of the predicted pitch contour of the syllable, wherein generating the prosodic representation for the utterance is based on the plurality of fixed-length predicted pitch frames generated for each syllable.

15. The system of claim 14, wherein the operations further comprise, for each syllable, using the selected utterance embedding and the prosody model:

predicting an energy contour of each phoneme in the syllable based on a predicted duration for the phoneme; and for each phoneme associated with the syllable, generating a plurality of fixed-length predicted energy frames based on the predicted duration for the corresponding phoneme, each fixed-length energy frame representing the predicted energy contour of the corresponding phoneme, wherein generating the prosodic representation for the utterance is further based on the plurality of fixed-length predicted energy frames generated for each phoneme associated with each syllable.

16. The system of claim 15, wherein a hierarchical linguistic structure represents the text utterance, the hierarchical linguistic structure comprising:

a first level including each syllable of the text utterance;

a second level including each phoneme of the text utterance;

a third level including each fixed-length predicted pitch frame for each syllable of the text utterance; and a fourth level parallel to the third level and including each fixed-length predicted energy frame for each phoneme of the text utterance.

17. The system of claim 16, wherein:

the first level of the hierarchical linguistic structure comprises a long short-term memory (LSTM) processing cell representing each syllable of the text utterance;

the second level of the hierarchical linguistic structure comprises a LSTM processing cell representing each phoneme of the text utterance, the LSTM processing cells of the second level clocking relative to and faster than the LSTM processing cells of the first level;

the third level of the hierarchical linguistic structure comprises a LSTM processing cell representing each fixed-length predicted pitch frame, the LSTM processing cells of the third level clocking relative to and faster than the LSTM processing cells of the second level; and the fourth level of the hierarchical linguistic structure comprises a LSTM processing cell representing each fixed-length predicted energy frame, the LSTM processing cells of the fourth level clocking at the same speed as the LSTM processing cells of the third level and clocking relative to and faster than the LSTM processing cells of the second level.

18. The system of claim 15, wherein the lengths of the fixed-length predicted energy frames and the fixed-length predicted pitch frames are the same.

19. The system of claim 15, wherein a total number of fixed-length predicted energy frames generated for each phoneme of the received text utterance is equal to a total number of the fixed-length predicted pitch frames generated for each syllable of the received text utterance.

20. The system of claim 13, wherein the operations further comprise:
obtaining the BERT model, the BERT model pre-trained on a text-only language modeling task;
receiving training data including a plurality of reference audio signals and corresponding transcripts, each reference audio signal comprising a spoken utterance of human speech and having a corresponding prosody, each transcript comprising a textual representation of the corresponding reference audio signal; and
training, using a deep neural network that incorporates the BERT model, the prosody model by encoding each reference audio signal into a corresponding fixed-length utterance embedding representing the corresponding prosody of the reference audio signal.

21. The system of claim 20, wherein encoding each reference audio signal into a corresponding fixed-length utterance embedding comprises:
generating, using the BERT model, a sequence of wordpiece embeddings from the transcript of the corresponding reference audio signal;
sampling, from the corresponding reference audio signal, a sequence of fixed-length reference frames providing a duration, pitch contour, and/or energy contour that represents the corresponding prosody of the reference audio signal; and for each syllable in the reference audio signal:
encoding phone-level linguistic features associated with each phoneme in the syllable into a phone feature-based syllable embedding;
encoding the fixed-length reference frames associated with the syllable into a frame-based syllable embedding, the frame-based syllable embedding indicative of a duration, pitch, and/or energy associated with the corresponding syllable; and
encoding, into a corresponding prosodic syllable embedding for the syllable, the phoneme feature-based and frame-based syllable embeddings with syllable-level linguistic features associated with the syllable, sentence-level linguistic features associated with the reference audio signal, and a wordpiece embedding from the sequence of wordpiece embeddings generated by the BERT model that is associated with a word that includes the corresponding syllable.

22. The system of claim 20, wherein training the prosody model further comprises, for each reference audio signal:
sampling, from the corresponding reference audio signal, a sequence of fixed-length reference frames providing a duration, pitch contour, and/or energy contour that represents the corresponding prosody of the reference audio signal;
decoding, using the transcript of the corresponding reference audio signal, the corresponding fixed-length utterance embedding into a sequence of fixed-length predicted frames representing a prosodic representation of the transcript;
generating gradients/losses between the sequence of fixed-length predicted frames decoded from the corresponding fixed-length utterance embedding and the sequence of fixed-length reference frames sampled; and
back-propagating the gradients/losses through the prosody model.

23. The system of claim 22, wherein back-propagating the gradients/losses through the prosody model comprises fine-tuning the pre-trained BERT model by updating parameters of the pre-trained BERT model based on the gradients/losses back-propagating through the prosody model.

24. The system of claim 13, wherein the utterance embedding comprises a fixed-length numerical vector.

* * * * *